(12) United States Patent
Lumsden

(10) Patent No.: US 8,085,009 B2
(45) Date of Patent: Dec. 27, 2011

(54) IGBT/FET-BASED ENERGY SAVINGS DEVICE FOR REDUCING A PREDETERMINED AMOUNT OF VOLTAGE USING PULSE WIDTH MODULATION

(75) Inventor: John L. Lumsden, Boca Raton, FL (US)

(73) Assignee: The Powerwise Group, Inc., Boca Raton, FL (US)

( * ) Notice: Subject to any disclaimer, the term of this patent is extended or adjusted under 35 U.S.C. 154(b) by 706 days.

(21) Appl. No.: 12/185,442

(22) Filed: Aug. 4, 2008

(65) Prior Publication Data

US 2009/0046490 A1    Feb. 19, 2009

Related U.S. Application Data

(60) Provisional application No. 60/964,587, filed on Aug. 13, 2007, provisional application No. 60/966,124, filed on Aug. 24, 2007, provisional application No. 61/009,844, filed on Jan. 3, 2008, provisional application No. 61/009,846, filed on Jan. 3, 2008, provisional application No. 61/009,845, filed on Jan. 3, 2008, provisional application No. 61/009,806, filed on Jan. 3, 2008.

(51) Int. Cl.
*G05F 1/00* (2006.01)

(52) U.S. Cl. ......... 323/239; 323/223; 323/224; 323/225

(58) Field of Classification Search .................. 323/237, 323/241, 244, 266, 274, 283, 300, 320, 322, 323/223, 224, 225
See application file for complete search history.

(56) References Cited

U.S. PATENT DOCUMENTS

| | | | |
|---|---|---|---|
| 2,276,358 A | | 3/1942 | Vickers |
| 2,345,933 A | * | 4/1944 | Green et al. .................. 323/212 |
| 3,470,443 A | | 9/1969 | Nola, et al. |
| 3,470,446 A | | 9/1969 | Nola, et al. |
| 3,523,228 A | | 8/1970 | Nola, et al. |
| 3,541,361 A | | 11/1970 | Nola |
| 3,582,774 A | | 6/1971 | Forgacs |
| 3,671,849 A | | 6/1972 | Kingston |

(Continued)

FOREIGN PATENT DOCUMENTS

EP    1650860 B1    8/2008

(Continued)

OTHER PUBLICATIONS

International Search Report for International Application No. PCT/US2008/009482, dated Nov. 6, 2008 (2 pages).

(Continued)

*Primary Examiner* — Jeffrey Sterrett
*Assistant Examiner* — Lakaisha Jackson
(74) *Attorney, Agent, or Firm* — Strasburger & Price, LLP

(57) ABSTRACT

An IGBT/FET-based energy savings device, system and method (1) wherein a predetermined amount of voltage below a nominal line voltage and/or below a nominal appliance voltage is saved, thereby conserving energy. Phase input connections (2) are provided for inputting analog signals into the device and system (1). A magnetic flux concentrator (3) senses the incoming analog signal (20) and a volts zero crossing point detector (5) determines the zero volts crossing point (21) of the signal (20). The positive half cycle (22) and negative half cycle (23) of the signal (20) are identified and routed to a digital signal processor (10) for processing the signal (20). The signal (20) is reduced by pulse width modulation and the reduced amount of energy is outputted, thereby yielding an energy savings for an end user.

77 Claims, 17 Drawing Sheets

U.S. PATENT DOCUMENTS

| | | | |
|---|---|---|---|
| 3,718,846 A | 2/1973 | Bejach | |
| 3,740,629 A | 6/1973 | Kohlhagen | |
| 3,753,472 A | 8/1973 | Dybwad et al. | |
| 3,860,858 A | 1/1975 | Nola | |
| 3,959,719 A | 5/1976 | Espelage | |
| 3,976,987 A | 8/1976 | Anger | |
| 4,039,946 A | 8/1977 | Nola | |
| 4,052,648 A | 10/1977 | Nola | |
| 4,096,436 A | 6/1978 | Cook et al. | |
| 4,168,491 A | 9/1979 | Phillips et al. | |
| 4,266,177 A | 5/1981 | Nola | |
| 4,333,046 A | 6/1982 | Lee | |
| 4,346,339 A | 8/1982 | Lewandowski | |
| 4,353,025 A | 10/1982 | Dobkin | |
| 4,388,585 A | 6/1983 | Nola | |
| 4,400,657 A | 8/1983 | Nola | |
| 4,404,511 A | 9/1983 | Nola | |
| 4,412,167 A | 10/1983 | Green et al. | |
| 4,417,190 A | 11/1983 | Nola | |
| 4,426,614 A | 1/1984 | Nola | |
| 4,429,269 A | 1/1984 | Brown | |
| 4,433,276 A | 2/1984 | Nola | |
| 4,439,718 A | 3/1984 | Nola | |
| 4,456,871 A | 6/1984 | Stich | |
| 4,469,998 A | 9/1984 | Nola | |
| 4,489,243 A | 12/1984 | Nola | |
| 4,513,240 A | 4/1985 | Putman | |
| 4,513,274 A | 4/1985 | Halder | |
| 4,616,174 A | 10/1986 | Jorgensen | |
| 4,644,234 A | 2/1987 | Nola | |
| 4,649,287 A | 3/1987 | Nola | |
| 4,659,981 A | 4/1987 | Lumsden | |
| 4,679,133 A | 7/1987 | Moscovici | |
| 4,689,548 A | 8/1987 | Mechlenburg | |
| 4,706,017 A | 11/1987 | Wilson | |
| 4,819,180 A | 4/1989 | Hedman et al. | |
| 4,859,926 A | 8/1989 | Wolze | |
| 4,876,468 A * | 10/1989 | Libert | 327/438 |
| 5,003,192 A | 3/1991 | Beigel | |
| 5,066,896 A | 11/1991 | Bertenshaw et al. | |
| 5,134,356 A | 7/1992 | El-Sharkawi et al. | |
| 5,136,216 A | 8/1992 | Wills et al. | |
| 5,180,970 A | 1/1993 | Ross | |
| 5,202,621 A | 4/1993 | Reischer | |
| 5,214,621 A | 5/1993 | Maggelet et al. | |
| 5,227,735 A | 7/1993 | Lumsden | |
| 5,239,255 A | 8/1993 | Schanin et al. | |
| 5,259,034 A | 11/1993 | Lumsden | |
| 5,299,266 A | 3/1994 | Lumsden | |
| 5,332,965 A * | 7/1994 | Wolf et al. | 324/207.12 |
| 5,350,988 A | 9/1994 | Le | |
| 5,362,206 A | 11/1994 | Westerman et al. | |
| 5,442,335 A | 8/1995 | Cantin et al. | |
| 5,481,140 A | 1/1996 | Maruyama et al. | |
| 5,481,225 A | 1/1996 | Lumsden et al. | |
| 5,506,484 A | 4/1996 | Munro et al. | |
| 5,543,667 A | 8/1996 | Shavit et al. | |
| 5,559,685 A | 9/1996 | Lauw et al. | |
| 5,600,549 A | 2/1997 | Cross | |
| 5,614,811 A | 3/1997 | Sagalovich et al. | |
| 5,615,097 A | 3/1997 | Cross | |
| 5,625,236 A | 4/1997 | Lefebvre et al. | |
| 5,635,826 A | 6/1997 | Sugawara | |
| 5,637,975 A | 6/1997 | Pummer et al. | |
| 5,652,504 A * | 7/1997 | Bangerter | 323/239 |
| 5,699,276 A | 12/1997 | Roos | |
| 5,732,109 A | 3/1998 | Takahashi | |
| 5,747,972 A | 5/1998 | Baretich et al. | |
| 5,754,036 A | 5/1998 | Walker | |
| 5,828,200 A | 10/1998 | Ligman et al. | |
| 5,880,578 A | 3/1999 | Oliveira et al. | |
| 5,909,138 A | 6/1999 | Stendahl | |
| 5,936,855 A | 8/1999 | Salmon | |
| 5,942,895 A | 8/1999 | Popovic et al. | |
| 5,945,746 A | 8/1999 | Tracewell et al. | |
| 5,946,203 A | 8/1999 | Jiang et al. | |
| 5,994,898 A | 11/1999 | DiMarzio et al. | |
| 6,005,367 A | 12/1999 | Rohde | |
| 6,013,999 A | 1/2000 | Nola et al. | |
| 6,055,171 A | 4/2000 | Ishii et al. | |
| 6,118,239 A | 9/2000 | Kadah | |
| 6,184,672 B1 | 2/2001 | Berkcan | |
| 6,191,568 B1 | 2/2001 | Poletti | |
| 6,198,312 B1 * | 3/2001 | Floyd | 327/77 |
| 6,225,759 B1 | 5/2001 | Bogdan et al. | |
| 6,259,610 B1 | 7/2001 | Karl et al. | |
| 6,265,881 B1 | 7/2001 | Meliopoulos et al. | |
| 6,274,999 B1 | 8/2001 | Fujii et al. | |
| 6,297,610 B1 | 10/2001 | Bauer et al. | |
| 6,326,773 B1 | 12/2001 | Okuma et al. | |
| 6,346,778 B1 * | 2/2002 | Mason et al. | 315/291 |
| 6,351,400 B1 | 2/2002 | Lumsden | |
| 6,400,098 B1 | 6/2002 | Pun | |
| 6,411,155 B2 | 6/2002 | Pezzani | |
| 6,414,455 B1 | 7/2002 | Watson | |
| 6,414,475 B1 | 7/2002 | Dames et al. | |
| 6,426,632 B1 | 7/2002 | Clunn | |
| 6,449,567 B1 | 9/2002 | Desai et al. | |
| 6,459,606 B1 | 10/2002 | Jadric | |
| 6,483,247 B2 | 11/2002 | Edwards et al. | |
| 6,486,641 B2 | 11/2002 | Scoggins et al. | |
| 6,489,742 B2 | 12/2002 | Lumsden | |
| 6,490,872 B1 | 12/2002 | Beck et al. | |
| 6,528,957 B1 | 3/2003 | Luchaco | |
| 6,548,988 B2 | 4/2003 | Duff, Jr. | |
| 6,548,989 B2 | 4/2003 | Duff, Jr. | |
| 6,553,353 B1 | 4/2003 | Littlejohn | |
| 6,599,095 B1 | 7/2003 | Takada et al. | |
| 6,618,031 B1 | 9/2003 | Bohn, Jr. et al. | |
| 6,643,149 B2 | 11/2003 | Arnet et al. | |
| 6,650,554 B2 | 11/2003 | Darshan | |
| 6,657,404 B1 | 12/2003 | Clark et al. | |
| 6,662,821 B2 | 12/2003 | Jacobsen et al. | |
| 6,664,771 B2 | 12/2003 | Scoggins et al. | |
| 6,678,176 B2 | 1/2004 | Lumsden | |
| 6,690,594 B2 | 2/2004 | Amarillas et al. | |
| 6,690,704 B2 | 2/2004 | Fallon et al. | |
| 6,718,213 B1 | 4/2004 | Enberg | |
| 6,724,043 B1 | 4/2004 | Ekkanath Madathil | |
| 6,747,368 B2 | 6/2004 | Jarrett, Jr. | |
| 6,774,610 B2 | 8/2004 | Orozco | |
| 6,781,423 B1 | 8/2004 | Knoedgen | |
| 6,801,022 B2 | 10/2004 | Fa | |
| 6,836,099 B1 | 12/2004 | Amarillas et al. | |
| 6,849,834 B2 | 2/2005 | Smolenski et al. | |
| 6,912,911 B2 | 7/2005 | Oh et al. | |
| 6,952,355 B2 | 10/2005 | Riggio et al. | |
| 6,963,195 B1 | 11/2005 | Berkcan | |
| 6,963,773 B2 | 11/2005 | Waltman et al. | |
| 7,010,363 B2 | 3/2006 | Donnelly et al. | |
| 7,019,474 B2 | 3/2006 | Rice et al. | |
| 7,019,498 B2 | 3/2006 | Pippin et al. | |
| 7,019,992 B1 | 3/2006 | Weber | |
| 7,019,995 B2 | 3/2006 | Niemand et al. | |
| 7,045,913 B2 | 5/2006 | Ebrahim et al. | |
| 7,049,758 B2 | 5/2006 | Weyhrauch et al. | |
| 7,049,976 B2 | 5/2006 | Hunt et al. | |
| 7,061,189 B2 | 6/2006 | Newman, Jr. et al. | |
| 7,062,361 B1 | 6/2006 | Lane | |
| 7,068,184 B2 | 6/2006 | Yee et al. | |
| 7,081,729 B2 | 7/2006 | Chang et al. | |
| 7,091,559 B2 | 8/2006 | Fragapane et al. | |
| 7,106,031 B2 | 9/2006 | Hayakawa et al. | |
| 7,119,576 B1 | 10/2006 | Langhammer et al. | |
| 7,123,491 B1 | 10/2006 | Kusumi | |
| 7,136,724 B2 | 11/2006 | Enberg | |
| 7,157,898 B2 | 1/2007 | Hastings et al. | |
| 7,164,238 B2 * | 1/2007 | Kazanov et al. | 315/291 |
| 7,188,260 B1 | 3/2007 | Shaffer et al. | |
| 7,205,822 B2 | 4/2007 | Torres et al. | |
| 7,211,982 B1 | 5/2007 | Chang et al. | |
| 7,245,100 B2 | 7/2007 | Takahashi | |
| 7,250,748 B2 | 7/2007 | Hastings et al. | |
| 7,256,564 B2 | 8/2007 | MacKay | |
| 7,259,546 B1 | 8/2007 | Hastings et al. | |
| 7,263,450 B2 | 8/2007 | Hunter | |
| 7,279,860 B2 | 10/2007 | MacKay | |

| | | |
|---|---|---|
| 7,288,911 B2 | 10/2007 | MacKay |
| 7,298,132 B2 | 11/2007 | Woolsey et al. |
| 7,298,133 B2 | 11/2007 | Hastings et al. |
| 7,301,308 B2 | 11/2007 | Aker et al. |
| 7,309,973 B2 | 12/2007 | Garza |
| 7,336,463 B2 | 2/2008 | Russell et al. |
| 7,336,514 B2 | 2/2008 | Amarillas et al. |
| 7,349,765 B2 | 3/2008 | Reaume et al. |
| 7,355,865 B2 | 4/2008 | Royak et al. |
| 7,358,724 B2 | 4/2008 | Taylor et al. |
| 7,378,821 B2 | 5/2008 | Simpson, III |
| 7,386,713 B2 | 6/2008 | Madter et al. |
| 7,394,397 B2 | 7/2008 | Nguyen et al. |
| 7,397,212 B2 | 7/2008 | Turner |
| 7,397,225 B2 | 7/2008 | Schulz |
| 7,412,185 B2 | 8/2008 | Hall et al. |
| 7,417,410 B2 | 8/2008 | Clark, III et al. |
| 7,417,420 B2 | 8/2008 | Shuey et al. |
| 7,436,233 B2 | 10/2008 | Yee et al. |
| 7,446,514 B1 | 11/2008 | Li et al. |
| 7,525,296 B2 | 4/2009 | Billig et al. |
| 7,528,503 B2 | 5/2009 | Rognli et al. |
| 7,602,136 B2 | 10/2009 | Garza |
| 7,605,495 B2 | 10/2009 | Achart |
| 7,615,989 B2 | 11/2009 | Kojori |
| 7,622,910 B2 | 11/2009 | Kojori |
| 7,719,214 B2 | 5/2010 | Leehey |
| 7,791,326 B2 | 9/2010 | Dahlman et al. |
| 7,902,788 B2 | 3/2011 | Garza |
| 7,919,958 B2 * | 4/2011 | Oettinger et al. ............. 323/283 |
| 8,004,255 B2 | 8/2011 | Lumsden |
| 2001/0010032 A1 | 7/2001 | Ehlers et al. |
| 2002/0109477 A1 | 8/2002 | Ikezawa |
| 2003/0090362 A1 | 5/2003 | Hardwick |
| 2003/0181288 A1 | 9/2003 | Phillippe |
| 2004/0153170 A1 | 8/2004 | Santacatterina et al. |
| 2004/0181698 A1 | 9/2004 | Williams |
| 2004/0189265 A1 | 9/2004 | Rice et al. |
| 2004/0239335 A1 | 12/2004 | McClelland et al. |
| 2005/0033951 A1 | 2/2005 | Madter et al. |
| 2005/0068013 A1 | 3/2005 | Scoggins |
| 2005/0073295 A1 | 4/2005 | Hastings et al. |
| 2006/0103365 A1 | 5/2006 | Ben-Yaacov |
| 2006/0175674 A1 | 8/2006 | Taylor et al. |
| 2006/0276938 A1 | 12/2006 | Miller |
| 2007/0024250 A1 | 2/2007 | Simpson, III |
| 2007/0024264 A1 * | 2/2007 | Lestician ............... 323/355 |
| 2007/0037567 A1 | 2/2007 | Ungless et al. |
| 2007/0069668 A1 | 3/2007 | MacKay |
| 2007/0071047 A1 | 3/2007 | Huang et al. |
| 2007/0213776 A1 | 9/2007 | Brink |
| 2007/0244603 A1 | 10/2007 | Level |
| 2007/0279053 A1 | 12/2007 | Taylor et al. |
| 2007/0283175 A1 | 12/2007 | Marinkovic et al. |
| 2007/0290645 A1 | 12/2007 | Boyadjieff et al. |
| 2007/0300084 A1 | 12/2007 | Goodrum et al. |
| 2007/0300085 A1 | 12/2007 | Goodrum et al. |
| 2008/0005044 A1 | 1/2008 | Benya et al. |
| 2008/0043506 A1 | 2/2008 | Ozaki et al. |
| 2008/0049452 A1 | 2/2008 | Van Bodegraven |
| 2008/0104430 A1 | 5/2008 | Malone et al. |
| 2008/0116825 A1 | 5/2008 | Descarries et al. |
| 2008/0121448 A1 | 5/2008 | Betz et al. |
| 2008/0177678 A1 | 7/2008 | Di Martini et al. |
| 2008/0221737 A1 | 9/2008 | Josephson et al. |
| 2008/0272934 A1 | 11/2008 | Wang et al. |
| 2008/0281473 A1 | 11/2008 | Pitt |
| 2008/0290731 A1 | 11/2008 | Cassidy |
| 2008/0291607 A1 | 11/2008 | Braunstein et al. |
| 2009/0018706 A1 | 1/2009 | Wittner |
| 2009/0045804 A1 | 2/2009 | Durling et al. |
| 2009/0046490 A1 | 2/2009 | Lumsden |
| 2009/0051344 A1 * | 2/2009 | Lumsden ............... 323/349 |
| 2009/0062970 A1 | 3/2009 | Forbes, Jr. et al. |
| 2009/0063228 A1 | 3/2009 | Forbes, Jr. |
| 2009/0083167 A1 | 3/2009 | Subbloie |
| 2009/0085545 A1 | 4/2009 | Shen et al. |
| 2009/0088907 A1 | 4/2009 | Lewis et al. |
| 2009/0094173 A1 | 4/2009 | Smith et al. |
| 2009/0105888 A1 | 4/2009 | Flohr et al. |
| 2009/0154206 A1 | 6/2009 | Fouquet et al. |
| 2009/0160267 A1 | 6/2009 | Kates |
| 2009/0189581 A1 | 7/2009 | Lawson et al. |
| 2009/0200981 A1 | 8/2009 | Lumsden |
| 2010/0001704 A1 | 1/2010 | Williams |
| 2010/0013427 A1 | 1/2010 | Kelley |
| 2010/0033155 A1 | 2/2010 | Lumsden |
| 2010/0117588 A9 | 5/2010 | Kelley |
| 2010/0320956 A1 | 12/2010 | Lumsden et al. |
| 2011/0080130 A1 | 4/2011 | Venkataraman |
| 2011/0121775 A1 | 5/2011 | Garza |
| 2011/0182094 A1 | 7/2011 | Lumsden et al. |

FOREIGN PATENT DOCUMENTS

| | | |
|---|---|---|
| JP | 11-007328 A | 1/1999 |
| JP | 11-241687 A | 9/1999 |
| JP | 2001-245496 | 9/2001 |
| JP | 2010-502533 A | 1/2010 |
| KR | 10-2001-0006838 A | 1/2001 |
| KR | 10-2009-0009872 | 1/2009 |
| WO | WO 00-66892 | 11/2000 |

OTHER PUBLICATIONS

Written Opinion of the International Search Authority for International Application No. PCT/US2008/009482, dated Nov. 6, 2008 (11 pages).

International Search Report for International Application No. PCT/US2008/009483, dated Nov. 18, 2008 (2 pages).

Written Opinion of the International Search Authority for International Application No. PCT/US2008/009483, dated Nov. 18, 2008 (6 pages).

International Search Report for International Application No. PCT/US2008/009533, dated Oct. 6, 2008 (2 pages).

Written Opinion of the International Search Authority for International Application No. PCT/US2008/009533, dated Oct. 6, 2008 (5 pages).

International Search Report for International Application No. PCT/US2008/010720, dated Nov. 25, 2008 (2 pages).

Written Opinion of the International Search Authority for International Application No. PCT/US2008/010720, dated Nov. 25, 2008 (4 pages).

International Search Report for International Application No. PCT/US2008/009393, dated Oct. 6, 2008 (3 pages).

Written Opinion of the International Searching Authority for International Application No. PCT/US2008/009393, dated Oct. 6, 2008 (13 pages).

Frick, Vincent, et al., "CMOS Microsystem for AC Current Measurement With Galvanic Isolation," IEEE Sensors Journal, Dec. 2003, pp. 752-760, vol. 3, No. 6, © 2003 IEEE (9 pages).

First Non-Final Office Action mailed Feb. 3, 2011, U.S. Appl. No. 12/187,186, filed Aug. 6, 2008, (19 pages).

Response and Amendment to First Non-Final Office Action mailed Apr. 8, 2011, U.S. Appl. No. 12/187,186, filed Aug. 6, 2008, (32 pages).

Final Office Action mailed Jun. 13, 2011, U.S. Appl. No. 12/187,186, filed Aug. 6, 2008, (233 pages).

PCT Notification of Transmittal of The International Search Report and The Written Opinion of the International Searching Authority, or the Declaration, from the International Searching Authority Korea (ISA/KR) Korean Intellectual Property Office mailed Sep. 7, 2011; corresponding to U.S. Appl. No. 12/967,128, now Publication No. US2011/0080130 A1 (our file No. 133) (9 pages).

Extended European Search Report, European Patent Office, for Application No. 08795029.1-1242/2183849 PCT/US2008009393 dated Aug. 1, 2011; corresponding U.S. Appl. No. 12/185,442, now Publication No. US2009/0046490 A1 (our file No. 113) (10 pages).

PCT Notification of Transmittal of The International Search Report and the Written Opinion of the International Searching Authority, or the Declaration, from the International Searching Authority Korea (ISA/KR) Korean Intellectual Property Office mailed Jun. 29, 2011 corresponding to U.S. Appl. No. 12/893,539 (not yet published) (our file No. 127) (8 pages).

English language translation of Japanese Patent JP-11-007328 A above (13 pages).

English language translation of Japanese Patent JP 11241687 above (16 pages).

English language translation of Japanese Patent JP 2001-245496 above (14 pages).

English language translation of Japanese Patent JP 2010-502533 A above (16 pages).

PCT Notification of Transmittal of The International Search Report and the Written Opinion of the International Searching Authority, or the Declaration, from the International Searching Authority USA (ISA/US) mailed Oct. 6, 2008; corresponding to U.S. Appl. No. 12/185,442, now Publication No. US2009/0046490 A1 (our file No. 113) (15 pages).

Frick, Vincent, Member, IEEE; Hebrard, Luc, Member, IEEE; Poure, Phillippe; Anstotz, Freddy; Braun, Francis; "CMOS Microsystem for AC Current Measurement with Galvanic Isolation"; IEEE Sensors Journal, vol. 3, No. 6, Dec. 2003; see NPL-H (our file 113) where considered a "Y" reference (9 pages).

PCT Notification Concerning Transmittal of Copy of International Preliminary Report on Patentability mailed Feb. 20, 2010 from the International Bureau of WIPO; corresponding to U.S. Appl. No. 12/185,442, now Publication No. US2009/0046490 A1 (our file No. 113) (14 pages).

PCT Notification of Transmittal of The International Search Report and the Written Opinion of the International Searching Authority, or the Declaration, from the International Searching Authority USA (ISA/US) mailed Nov. 6, 2008; corresponding to U.S. Appl. No. 12/187,136, now Publication No. US2009/0051344 A1 (our file No. 114) (15 pages).

PCT Notification of Transmittal of The International Search Report and the Written Opinion of the International Searching Authority, or the Declaration, from the International Searching Authority USA (ISA/US) mailed Nov. 18, 2008; corresponding to U.S. Appl. No. 12/187,186, now Publication No. US2009/0200981 A1 (our file No. 115) (9 pages).

PCT Notification of Transmittal of The International Search Report and the Written Opinion of the International Searching Authority, or the Declaration, from the International Searching Authority USA (ISA/US) mailed Oct. 6, 2008; corresponding to U.S. Appl. No. 12/187,805, now Publication No. US2010/0033155 A1 (our file No. 116) (7 pages).

PCT Notification Concerning Transmittal of Copy of International Preliminary Report on Patentability mailed Feb. 17, 2011 from The International Bureau of WIPO; International Application No. PCT/US2008/009533 corresponding to U.S. Appl. No. 12/187,805, now Publication No. US2010/0033155 A1 (our file No. 116) (6 pages).

PCT Notification of Transmittal of The International Search Report and the Written Opinion of the International Searching Authority, or the Declaration, from the International Searching Authority USA (ISA/US) mailed Nov. 25, 2008; corresponding to International Application No. PCT/US 08/10720 and U.S. Appl. No. 12/207,913, now Publication No. US2010/0013427 A1 (our file No. 117) (8 pages).

PCT Notification Concerning Transmittal of Copy of International Preliminary Report on Patentability mailed Mar. 25, 2010 from The International Bureau of WIPO; corresponding to International Application No. PCT/US2008/1010720 and U.S. Appl. No. 12/207,913, now Publication No. US2010/0013427 A1 (our file No. 117) (7 pages).

English language translation of Official Action from the Eurasian Patent Office pertaining to Application No. 201070369/(OFE/1004/0111) and original Office Action both corresponding to PCT Application No. US 2008/010720 dated Apr. 26, 2011 and U.S. Appl. No. 12/207,913, now Publication No. US2010/0013427 A1 (our file No. 117) (2 pages).

PCT Notification of Transmittal of The International Search Report and the Written Opinion of the International Searching Authority, or the Declaration, from the International Searching Authority USAa (ISA/US), mailed Oct. 15, 2010; corresponding to U.S. Appl. No. 12/873,510, now Publication No. US2010/0320956 A1 (our file No. 123) (11 pages).

* cited by examiner

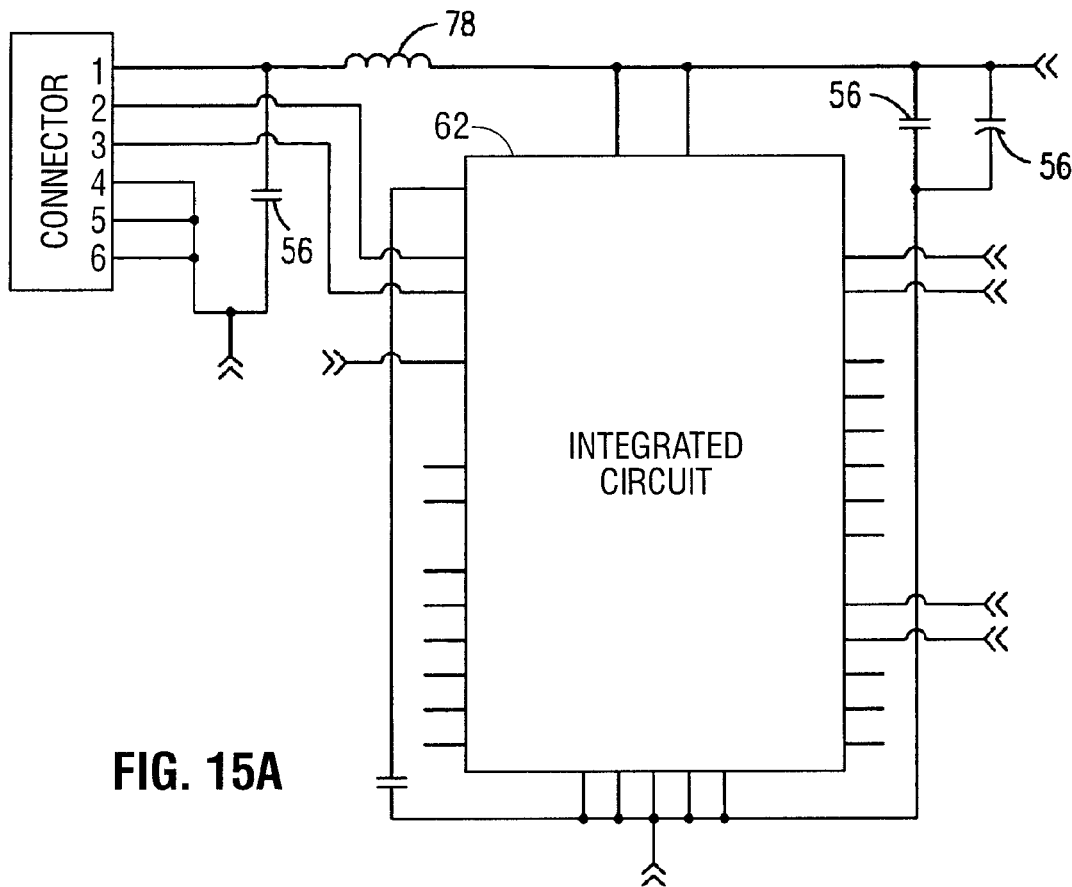
FIG. 15A
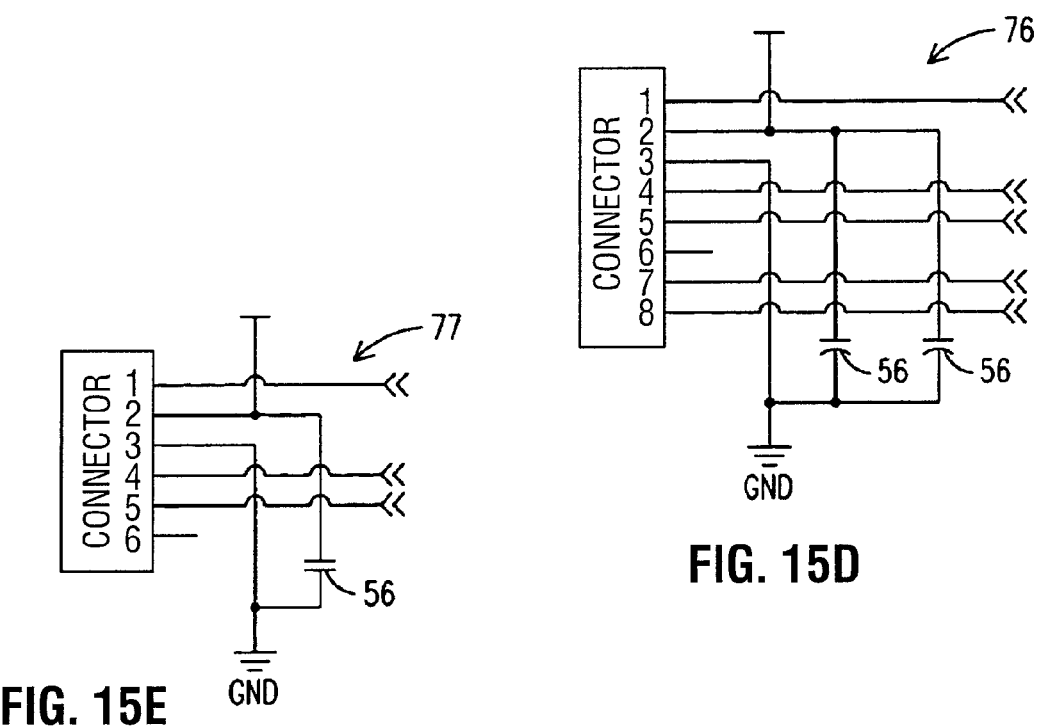
FIG. 15E
FIG. 15D

IGBT/FET-BASED ENERGY SAVINGS DEVICE FOR REDUCING A PREDETERMINED AMOUNT OF VOLTAGE USING PULSE WIDTH MODULATION

CROSS REFERENCE TO RELATED APPLICATION

This application claims the benefit of U.S. Provisional Application Nos. 60/964,587 filed Aug. 13, 2007; 60/966,124 filed Aug. 24, 2007; 61/009,844 filed Jan. 3, 2008; 61/009,846 filed Jan. 3, 2008; 61/009,845 filed Jan. 3, 2008; and 61/009,806 filed Jan. 3, 2008.

BACKGROUND OF THE INVENTION

This invention relates to energy savings devices, systems and methods, more particularly, an insulated gate bipolar transistor/field effect transistor (IGBT/FET) based energy savings device, system and method for use wherein a predetermined amount of voltage below a nominal line voltage and/or below a nominal appliance voltage is saved, thereby conserving energy.

Since the industrial revolution, the world's consumption of energy has grown at a steady rate. Most power generated and energy consumed is from the combustion of fossil fuels, a nonrenewable, natural resource that is rapidly becoming depleted. As the depletion of Earth's natural resources continues, power generation and energy conservation has become an increasingly important issue with governments in both this country and abroad. In addition, not only are governments concerned with power generation and energy conservation, but businesses and consumers are also concerned as the costs for such resources are rapidly increasing.

Not only do there exist worldwide concerns with power generation and energy conservation, but there also exist concerns with power distribution as well, especially in emerging economies. Although power generation and energy conservation are of great importance, the problem of power distribution is also of great concern as it involves existing infrastructure that is usually inadequate for properly distributing power and not readily suitable to be improved upon. This problematical situation is manifested by "brown outs" wherein a nominal AC voltage cannot be maintained in the face of a grid/generation overload.

Currently, governmental entities and power companies attempt to remedy brown out occurrences by elevating the AC voltage or adding power shedding generation at appropriate locations on the power grid. This method usually results in a wide disparity of voltages available to consumers in homes and/or business. The voltage increases may range from ten percent to fifteen percent (10%-15%) and, since power is calculated by Voltage$^2$/load, the result of the governmental entities' and power companies' "remedy" can result in increased charges to the consumer of up to twenty-five percent (25%). Thus, rather than conserving energy, governmental entities and power companies are expending energy.

Furthermore, although most appliances and equipment used in businesses and homes are capable of performing, exactly to specification, at the nominal voltage minus ten percent (10%), most energy savings devices do not exploit this feature. Thus, a further potential for energy savings is oftentimes ignored.

Therefore, a need exists for an IGBT/FET-based energy savings device, system and method wherein a predetermined amount of voltage below a nominal line voltage and/or below a nominal appliance voltage is saved, thereby conserving energy.

The relevant prior art includes the following references:

| Patent/Ser. No. (U.S. unless stated otherwise) | Inventor | Issue/Publication Date |
|---|---|---|
| 6,664,771 | Scoggins et al. | Dec. 16, 2003 |
| 6,486,641 | Scoggins et al. | Nov. 26, 2002 |
| 2005/0068013 | Scoggins | Mar. 31, 2005 |
| 6,489,742 | Lumsden | Dec. 03, 2002 |
| 7,010,363 | Donnelly et al. | Mar. 07, 2006 |
| 5,652,504 | Bangerter | Jul. 29, 1997 |
| 5,625,236 | Lefebvre et al. | Apr. 29, 1997 |
| 5,543,667 | Shavit et al. | Aug. 06, 1996 |
| 5,442,335 | Cantin et al. | Aug. 15, 1995 |
| 5,134,356 | El-Sharkawi et al. | Jul. 28, 1992 |
| 5,003,192 | Beigel | Mar. 26, 1991 |
| 3,959,719 | Espelage | May 25, 1976 |
| 4,706,017 | Wilson | Nov. 10, 1987 |
| 2007/0279053 | Taylor et al. | Dec. 06, 2007 |
| 6,963,195 | Berkcan | Nov. 08, 2005 |
| 6,184,672 | Berkcan | Feb. 06, 2001 |
| 3,582,774 | Forgacs | Jun. 01, 1971 |
| 5,994,898 | DiMarzio et al. | Nov. 30, 1999 |
| 7,358,724 | Taylor et al. | Apr. 15, 2008 |
| 7,259,546 | Hastings et al. | Aug. 21, 2007 |
| 7,250,748 | Hastings et al. | Jul. 31, 2007 |
| 7,298,132 | Woolsey et al. | Nov. 20, 2007 |
| 7,298,133 | Hastings et al. | Nov. 20, 2007 |
| 7,157,898 | Hastings et al. | Jan. 02, 2007 |
| 6,912,911 | Oh et al. | Jul. 05, 2005 |
| 5,180,970 | Ross | Jan. 19, 1993 |
| 6,414,475 | Dames et al. | Jul. 02, 2002 |
| 2008/0084201 | Kojori | Apr. 10, 2008 |
| 7,358,724 | Taylor et al. | Apr. 15, 2008 |
| 6,426,632 | Clunn | Jul. 30, 2002 |
| 6,265,881 | Meliopoulos et al. | Jul. 24, 2001 |
| 5,202,621 | Reischer | Apr. 13, 1993 |
| 4,616,174 | Jorgensen | Oct. 07, 1986 |
| 4,513,274 | Halder | Apr. 23, 1985 |
| 4,096,436 | Cook et al. | Jun. 20, 1978 |
| 3,976,987 | Anger | Aug. 24, 1976 |
| 2008/0084200 | Kojori | Apr. 10, 2008 |
| 2004/0239335 | McClelland et al. | Dec. 02, 2004 |
| 7,301,308 | Aker et al. | Nov. 27, 2007 |
| 6,548,989 | Duff, Jr. | Apr. 15, 2003 |
| 6,548,988 | Duff, Jr. | Apr. 15, 2003 |
| 7,245,100 | Duff, Jr. | Jul. 17, 2007 |
| 7,205,822 | Torres et al. | Apr. 17, 2007 |
| 7,091,559 | Fragapane et al. | Aug. 15, 2006 |
| 6,724,043 | Ekkanath Madathil | Apr. 20, 2004 |
| 6,618,031 | Bohn, Jr. et al. | Sep. 09, 2003 |
| 6,411,155 | Pezzani | Jun. 25, 2002 |
| 5,559,685 | Lauw et al. | Sep. 24, 1996 |
| 6,055,171 | Ishii et al. | Apr. 25, 2000 |
| 7,355,865 | Royak et al. | Apr. 08, 2008 |
| 7,123,491 | Kusumi | Oct. 17, 2006 |
| 6,650,554 | Darshan | Nov. 18, 2003 |
| 5,946,203 | Jiang et al. | Aug. 31, 1999 |
| 5,936,855 | Salmon | Aug. 10, 1999 |
| 5,600,549 | Cross | Feb. 04, 1997 |
| 4,679,133 | Moscovici | Jul. 07, 1987 |
| 2008/0043502 | Billig et al. | Feb. 21, 2008 |

SUMMARY OF THE INVENTION

The primary object of the present invention is to provide an IGBT/FET-based device, system and method wherein a predetermined amount of voltage below a nominal line voltage is saved, thereby conserving energy.

Another object of the present invention is to provide an IGBT/FET-based device, system and method wherein a predetermined amount of voltage below a nominal appliance voltage is saved, thereby conserving energy.

A further object of the present invention is to provide an IGBT/FET-based device, system and method that may be used for a variety of applications, including, but not limited to, whole house energy savings devices, motor controllers, small appliance regulators and any application wherein the measurement of AC current is required.

Another object of the present invention is to provide an IGBT/FET-based device, system and method that may be used for the following: controllers for refrigerators, freezers, air conditioners, AC electric motors and AC voltage; single, bi- and poly-phase whole house energy savings devices; commercial and industrial energy savings devices; and AC voltage regulators.

A further object of the present invention is to provide an IGBT/FET-based device, system and method that virtually eliminates brown outs caused by energy overload on a power grid.

An even further object of the present invention is to provide an IGBT/FET-based device, system and method that reduces a load on a power grid.

Another object of the present invention is to provide an IGBT/FET-based device, system and method that may be used to reduce the load imposed on a power grid during peak load times.

An even further object of the present invention is to provide an IGBT/FET-based device, system and method that permits governmental entities and/or power companies to manage power from a demand perspective as opposed to a production and/or delivery perspective.

Another object of the present invention is to provide an IGBT/FET-based device, system and method that is low in costs after the initial cost of the equipment utilized in the system is amortized.

Another object of the present invention is to provide an IGBT/FET-based device, system and method provides accurate power control and regulation.

Another object of the present invention is to provide an IGBT/FET-based device, system and method wherein the device may be programmed by a user for activation for a specific time and/or date period.

An even further object of the present invention is to provide an IGBT/FET-based device, system and method wherein a user may program individual and/or multiple energy savings percentage reductions.

A further object of the present invention is to provide an IGBT/FET-based device, system and method that is adaptable to a plurality of powers and/or frequencies.

A further object of the present invention is to provide an IGBT/FET-based device, system and method that may be small in size.

Another object of the present invention is to provide an IGBT/FET-based device, system and method that is preferably affordable to an end user.

An even further object of the present invention is to provide an IGBT/FET-based device, system and method that allows a user to manage peak demand at point of consumption rather than at point of generation.

Another object of the present invention is to provide an IGBT/FET-based device, system and method that provides galvanic isolation of a central processing unit (if utilized) from an AC power source.

An even further object of the present invention is to provide an IGBT/FET-based device, system and method that may include synchronous or random pulse width modulation.

Another object of the present invention is to provide an IGBT/FET-based device, system and method that reduces harmonics resulting from currently utilized energy savings devices.

The present invention fulfills the above and other objects by providing an IGBT/FET-based device, system and method wherein a predetermined amount of voltage below a nominal line voltage and/or below a nominal appliance voltage is saved, thereby conserving energy. Phase input connections are provided for inputting analog signals into the device and system. A magnetic flux concentrator senses the incoming analog signal and a volts zero crossing point detector determines the zero volts crossing point of the signal. The positive half cycle and negative half cycle of the signal is identified and routed to a digital signal processor for processing the signal. The signal is reduced by a driver control via pulse width modulation and the reduced amount of energy is outputted, thereby yielding an energy savings for an end user.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 15A is a circuit diagram a communication means of the present invention;

FIG. 15D is a circuit diagram of a first connector of a communications means of FIG. 15A into a digital signal processor;

FIG. 15E is a circuit diagram of a second connector of a communications means of FIG. 15A;

DESCRIPTION OF THE PREFERRED EMBODIMENTS

Figure 1:
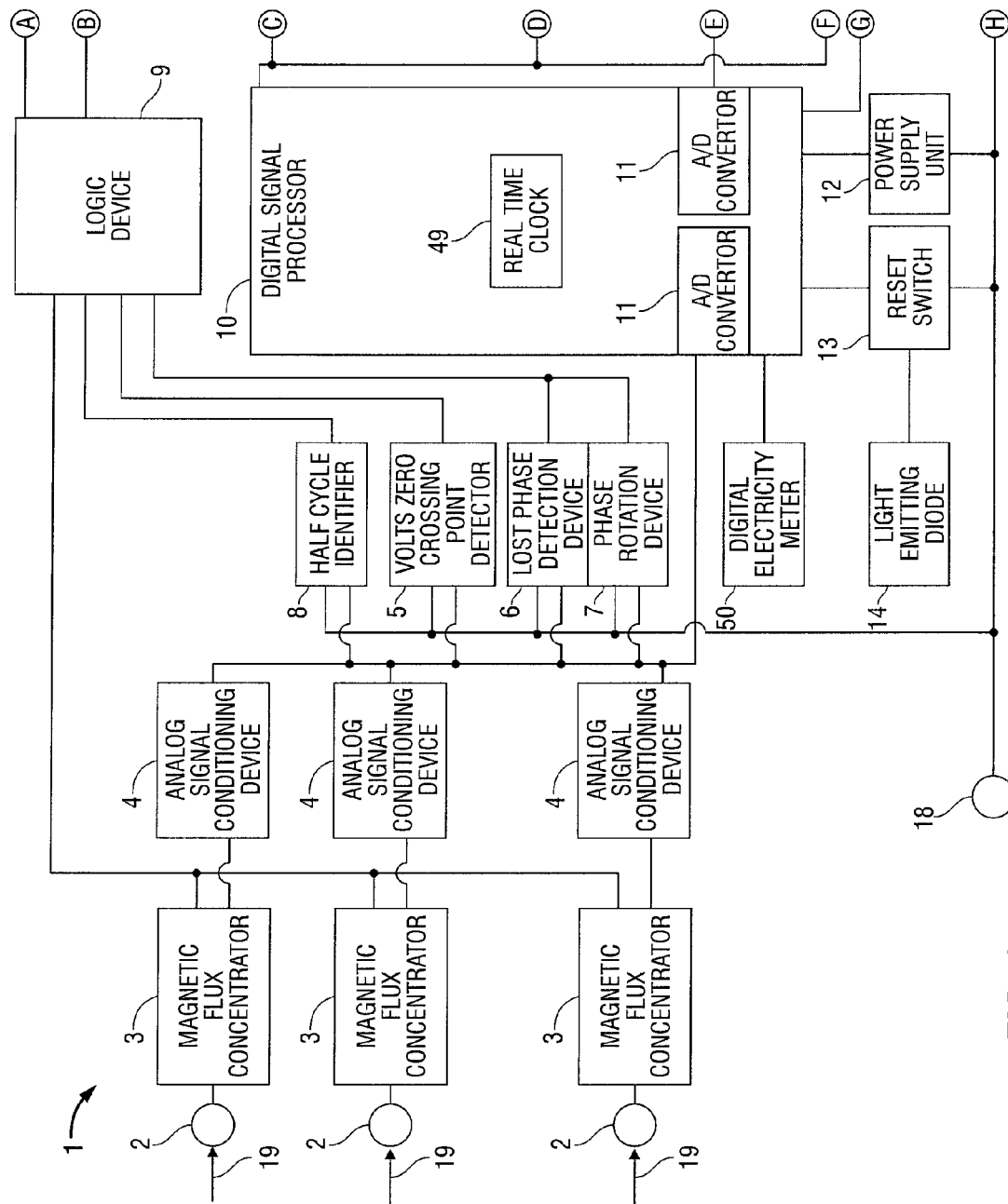
FIG. 1 is a block diagram of an IGBT/FET-based device and system of the present invention for use in a three-phase electrical system.
Figure 1:
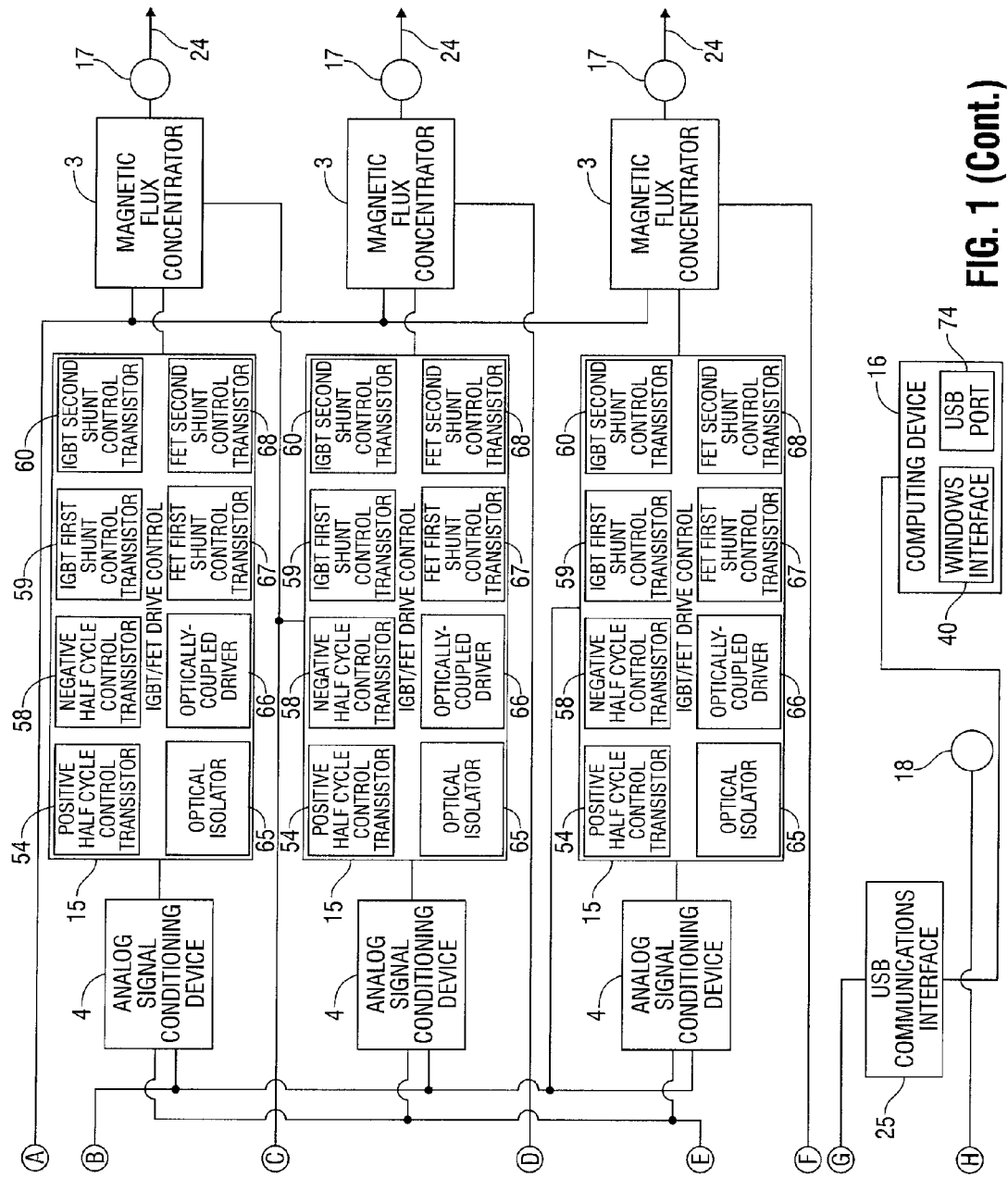

For purposes of describing the preferred embodiment, the terminology used in reference to the numbered components in the drawings is as follows:

1. IGBT/FET-based energy savings device and system, generally
2. phase input connection
3. magnetic flux concentrator
4. analog signal conditioning device
5. volts zero crossing point detector
6. lost phase detection device
7. phase rotation device
8. half cycle identifier
9. logic device
10. digital signal processor
11. A/D converter
12. power supply unit
13. reset switch
14. light emitting diode
15. IGBT/FET drive control
16. computing device
17. phase output connection
18. neutral
19. incoming energy
20. analog signal
21. volts zero crossing point
22. positive half cycle
23. negative half cycle
24. reduced energy
25. USB communications interface
26. circuit board
27. housing
28. conductor
29. housing top half
30. housing bottom half
31. hinge
32. first filter
33. second filter
34. comparator
35. Schmidt buffer
36. absolute zero cross signal
37. magnetic flux concentrator chip
38. aperture
39. incoming sine wave
40. windows interface
41. main monitoring screen
42. field, generally
43. operational mode field
44. phase field
45. startup field
46. calibration field
47. setpoints field
48. indicators
49. real time clock
50. digital electricity meter
51. Schmidt-triggered inverting buffer
52. transorb device
53. diode transistor
54. positive half cycle control transistor
55. FET
56. capacitor
57. transformer
58. negative half cycle control transistor
59. IGBT first shunt control transistor
60. IGBT second shunt control transistor
61. shunt device
62. integrated circuit
63. resistor
64. split rail generator
65. optical isolator
66. optically-coupled driver
67. FET first shunt control transistor
68. FET second shunt control transistor
69. square wave
70. operational amplifier
71. isolator
72. rectifier
73. transistor
74. USB port
75. Zener diode
76. first connector
77. second connector
78. inductor
79. resistor support
80. logic device connector
81. linear voltage regulator
82. positive half cycle drive signal applied to positive half cycle control transistor
83. negative half cycle drive signal applied to negative half cycle control transistor
84. drive signal applied to positive half cycle control transistor during negative half cycle
85. drive signal applied to negative half cycle control transistor during positive half cycle
86. drive signal applied to IGBT first shunt control transistor during negative half cycle
87. drive signal applied to IGBT second shunt control transistor during positive half cycle
88. drive signal applied to FET first shunt control transistor during negative half cycle
89. drive signal applied to FET second shunt control transistor during positive half cycle
90. switching regulator With reference to FIG. 1, a block diagram of an energy savings device and system 1 of the present invention for use in a three-phase electrical system is shown. The energy savings device and system 1 includes various components and means for reducing the amount of energy inputted wherein the reduced energy yields a virtually non-existent or minimal effect on the performance of an electronically-operated device.

A predetermined amount of incoming energy 19 having at least one analog signal 20 therein is inputted into the device and system 1 via an inputting means, which is preferably at least one phase input connection 2. A neutral 18 line is also provided in the device and system 1. As shown in FIG. 1, the system and device 1 is utilized in a three-phase electrical system having an A-B-C phase plus neutral for use as a reference point and as a sink for a clamped back-EMF that is produced when the current in a lagging power factor load is interrupted. However, the energy savings system 1 of the present invention may be utilized in a single phase system and/or a bi-phase system as well, wherein the only difference in structure is the amount of phase input connections 2 (e.g., in a single phase system, only one phase input connection 2 is utilized in addition to a neutral connection (A) and in a bi-phase system, two phase input connections 2 are utilized (A & B) in addition to a neutral connection).

At least one phase input connection 2 is connected to at least one sensing means, which is preferably at least one magnetic flux concentrator 3, that senses the predetermined amount of incoming energy 19. The magnetic flux concentrator 3 galvanically isolates the current of the incoming energy 19 and reports any over-current conditions to a routing means, which is preferably at least one logic device 9. If there are any over-current conditions, then the over-current conditions are simultaneously reported to the logic device 9 and a processing means, which is preferably a digital signal processor 10, wherein the digital signal processor 10 immediately shuts down the device and system 1. This electronic breaker action is intended to safeguard the device and system 1 itself, as well as the terminal equipment used in conjunction with the device and system 1 in the event of a short circuit or overload. Thus, the logic device 9 provides total protection of the power control devices in the event of a software/firmware glitch and/or power line glitch or surge in real-time as the reaction time of the logic device 9 and digital signal processor 10 is preferably 5 μs. The logic device 9 arbitrates between the drive signals applied to the IGBT/FET half cycle control transistors 54 and 58 and the signals applied to the IGBT/FET shunt control transistors 59, 60, 67 and 68. Therefore, it avoids the IGBT/FET half cycle control transistors 54 and 58 and IGBT/FET shunt control transistors 59, 60, 67 and 68 from being simultaneously driven to an on-condition that could lead to the failure of the power control and/or shunt elements. The digital signal processor 10 preferably includes at least one A/D converter 11.

Prior to reporting the analog value of the phase current from the phase input connection 2 to the digital signal processor 10, the magnetic flux concentrator 3 first transmits the incoming energy 19 through at least one signal conditioning means, which is preferably at least one analog signal conditioning device 4. After the signal(s) have been conditioned, a method which is described below, the conditioned signals are then sent to a volts zero crossing point determining means, which is preferably at least one volts zero crossing point detector 5, for detecting the point where the AC voltage goes through zero volts relative to neutral 18, which is commonly referred to as a zero crossing point.

After the zero crossing point is detected and if using a three-phase electrical system, the conditioned signal then enters at least one loss detecting means, which is preferably at least one lost phase detection device 6 and at least one phase rotation determination and rotating means, which is preferably at least one phase rotation device 7, so as to prepare the signal for proper inputting into at least one half cycle identifying means, which is preferably at lest one half cycle identifier 8, and then the logic device 9 and digital signal processor 10. Details of the half cycle identifier 8 are discussed below.

The power control is executed via at least one voltage reducing means, which preferably includes at least one IGBT/FET drive control 15, in electrical connection with the digital signal processor 10 to reduce the energy a predetermined amount. Prior to the processed signals entering the reducing means, however, the signals may once again be conditioned through at least one analog signal conditioning device 4 so as to clean a signal to remove any spurious signals or transient signals. The command signals to exercise control of the IGBT/FET drive control 15 of the voltage reducing means are determined by the digital signal processor 10 and mitigated by the logic device 9.

The reduced energy 24 then enters at least one magnetic flux concentrator 3 and then enters at least one outputting means, which is preferably at least one phase output connection 17, and is outputted to an electrically-operated device for consumption.

The system and device 1 is powered via a powering means, which is preferably a power supply unit 12 in electrical connection with the digital signal processor 10. A resetting means, which is preferably a reset switch 13, is preferably provided to permit a user to reset the device and system 1 as desired. In addition, an indicator means, such as a light emitting diode 14, may be in electrical connection withe reset switch 13 so as to alert a user if the device and system 1 needs to be reset.

The device and system 1 may optionally include at least one digital electricity meter 50 and at least one communication means, such as a USB communications interface 25, capable of interfacing with at least one computing device 16 having at least one USB port 74 and at least one window interface 40, via wired or wireless transmission. The USB communications interface 25 permits a user to monitor, display and/or configure the device and system 1 via his/her computing device 16. However, inclusion of the USB communications interface 25 is not necessary in the implementation of the device and system 1. In addition, a real time clock 49 may optionally be incorporated within the digital signal processor 10 of or otherwise connected to the energy savings device and system 1.

A user may determine the operational manner in which to use the energy savings device and system 1 of the present invention, e.g., a user may select how he/she would like to save energy by either inputting the desired RMS value, inputting the desired percentage voltage or inputting the desired percentage savings reduction into a computing device 16. For example, if a user chooses to reduce the incoming voltage by a fixed percentage, the energy savings device and system 1 permits such voltage percentage reduction and automatically lowers the voltage so as to be consistent with a maximum allowed harmonic content by establishing a lower voltage threshold. The lower voltage threshold assures that in lower or brown-out conditions, the system and device 1 does not continue to attempt to reduce the available voltage by the percentage reduction specified.

Figure 2:
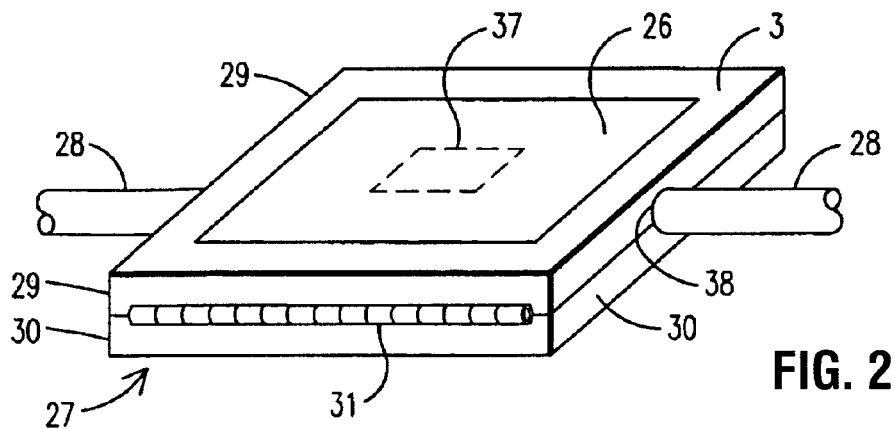
FIG. 2 is perspective plan view of a sensing means of the present invention.

FIG. 2 is perspective plan view of a sensing means of the present invention is shown. The sensing means, which is preferably at least one magnetic flux concentrator 3, measures AC current galvanically when connected to active circuitry of the device and system 1 of the present invention. A housing 27, which preferably is made of plastic, includes a housing top half 29 and a housing bottom half 30 and a hinge 30 connecting the two halves 29 and 30, carries a circuit board 26 having a magnetic flux concentrator chip 37 mounted on the bottom side of the housing top half 29. Each half 29 and 30 includes at least one notched portion wherein when the halves 29 and 30 are joined together, at least one aperture 38 is formed for permitting a conductor 28 to extend therethrough. The utilization of said housing 27 accurately defines the distance between the magnetic flux concentrator chip 37 and the core center of the conductor 28. A window detector associated with the magnetic flux concentrator chip 37 accurately determines when current, within the negative or positive half cycles, is out of a normal ranges. In addition, the magnetic flux concentrator 3 uses an open collector Schmidt buffer to allow multiple concentrators 3 to be connected to both the analog signal conditioning device 4 and the logic device 9.

The housing 27 snaps together and bears on the conductor 28, which is preferably a cable, to ensure that the conductor 28 is held firmly against the housing 27. The housing top half 29 may be formed in various sizes so as to accommodate differing wire gauges. A plurality of apertures 38 of various sizes may be formed when the halves 29 and 30 are snapped together so as to accommodate conductors 28 of various widths. The magnetic flux concentrator 3 provides galvanic isolation of the incoming energy 19, performs accurate current measurement, is adaptable to any range of currents through multiple cable passages located within the housing 27, provides high voltage galvanic isolation, has zero harmonic distortion and superb linearity. In addition, since the current measurement range is determined by mechanical means, no changes are necessary to the printed circuit board 26. The following equation determines the approximate sensitivity:

$$V_{out}=0.06*I/(D+0.3 \text{ mm})$$

where I=current in the conductor 28 and D=the distance in mm from the top surface of the magnetic flux concentrator chip 37 to the center of the conductor 28.

Since no electrical connection is made to the measurement target, full galvanic isolation is achieved. Moreover, there is zero insertion loss and, therefore, no heat is dissipated nor energy lost as there is no electrical connection made nor is a shunt or a transformer used.

Figure 3:
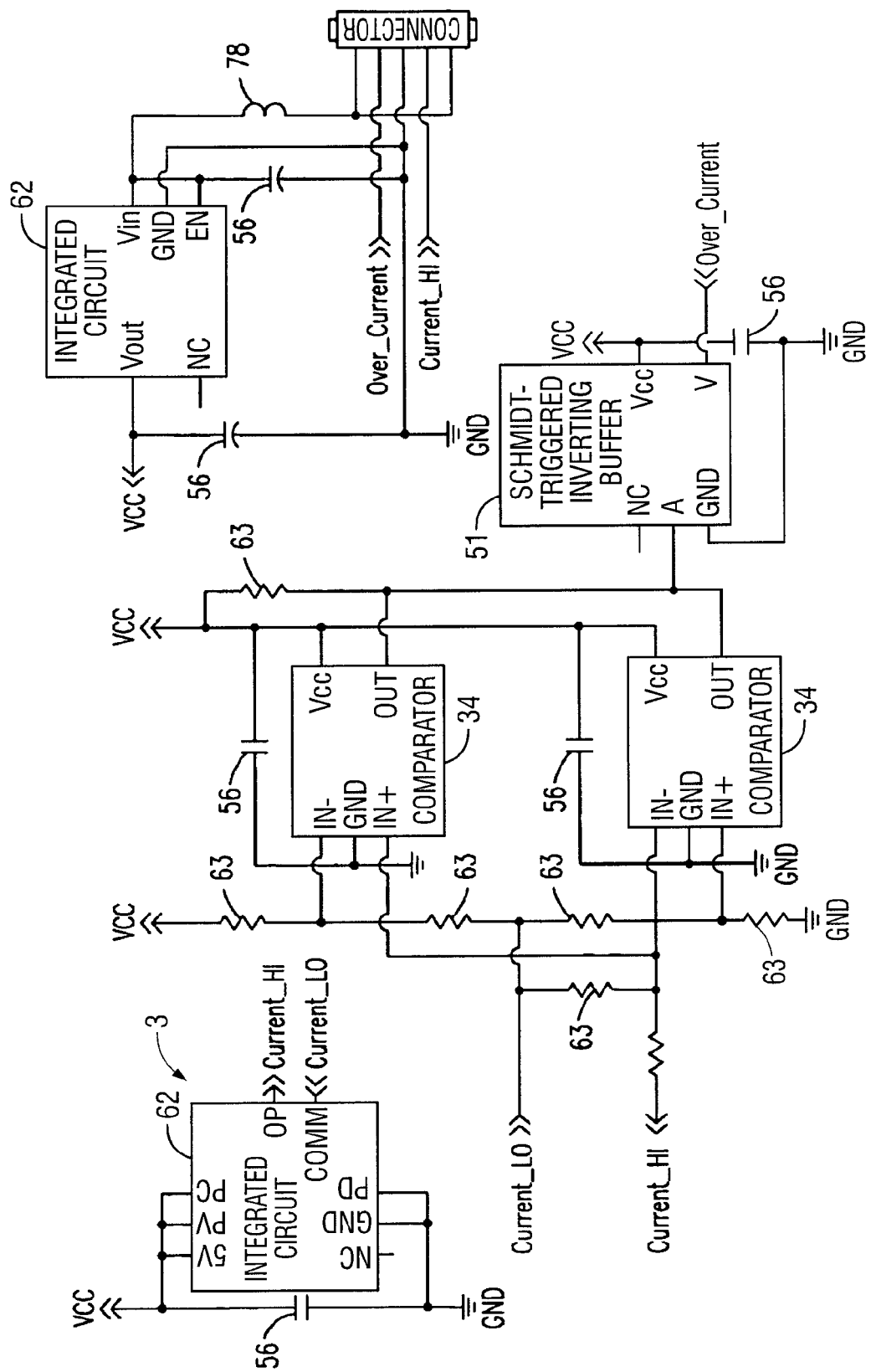
FIG. 3 is a circuit diagram of a sensing means of the present invention.

FIG. 3 is a circuit diagram of the sensing means of the present invention. The magnetic flux concentrator 3 measures the magnetic flux generated when an alternating electric current flows within the conductor 28. Over-current is accomplished by comparators 34 that form a window comparator. When the thresholds set by resistors 63 are exceeded by an output of the magnetic flux concentrator 3, which may yield a "Current_Hi" signal, open collector outputs of comparators 34 go low and pass to the logic device 9 and a microprocessor non-maskable input to shut-down the device and system 1. To avoid ground loop problems, the magnetic flux concentrator 3 preferably includes an integrated circuit 62 that regulates the operational voltage of the magnetic flux concentrator 3 to 5VDC.

Figure 4:
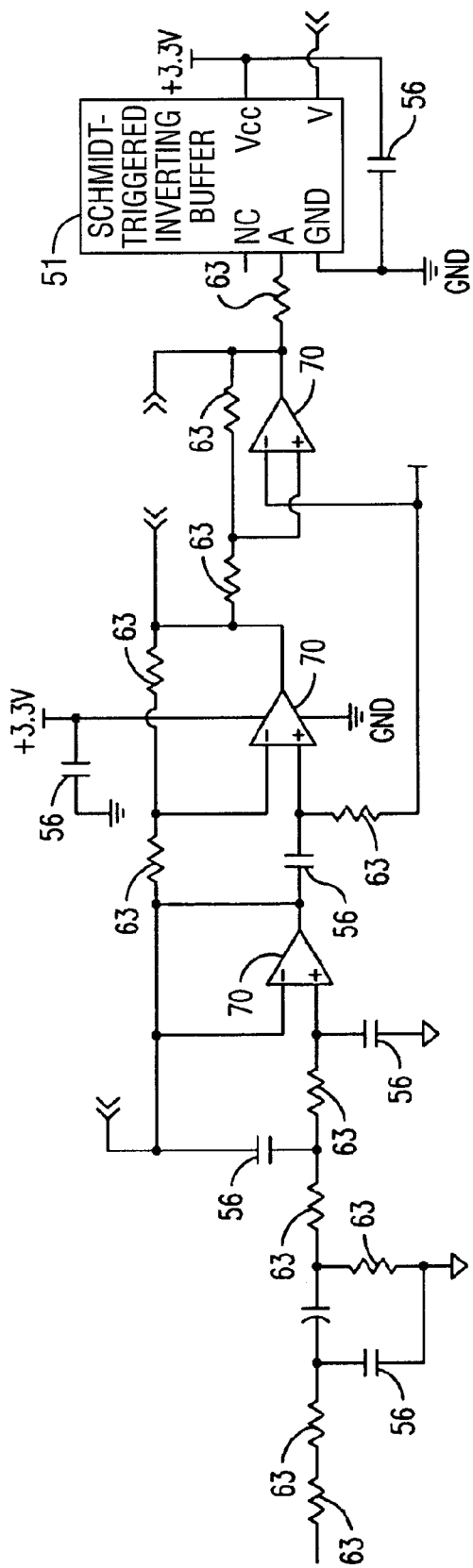
FIG. 4 is a circuit diagram of a signal conditioning means of the present invention.

With reference to FIG. 4, a circuit diagram of a signal conditioning means of the present invention is shown. The signal conditioning means, which is preferably at least one analog signal conditioning device 4, cleans or conditions a 50/60 Hz sine wave analog signal so as to remove any spurious signals or transient signals prior to its transmittal to the half cycle identifier 8. If the sine wave has any noise or distortion of sufficient amplitude, this can, under certain circumstances, give rise to false zero cross detections. Thus, the inclusion of such analog signal conditioning device 4 is of importance.

To properly condition the sine wave signal, operational amplifiers 70 are utilized. An operational amplifier 70 is configured as an active, second order, low pass filter to remove or reduce harmonics and any transients or interfering signals that may be present. When utilizing such filter, however, group delay occurs wherein the group delay offsets, in time, the zero crossing of the filtered signal from the actual zero crossing point of the incoming AC sine wave. To remedy the delay, operational amplifiers 70 are provided to allow the phase change necessary to correct the zero crossing point accurately in time as required. The output of the operational amplifiers 70 is the fully conditioned 50/60 Hz sine wave signal that is connected to the A/D converter 11 of the digital signal processor 10 (see FIG. 1) for root-mean-square (RMS) value measurement. This signal is exactly half the supply rail which is necessary to enable measurement of both positive and negative half cycles. The A/D converter 11 performs the well-known 2 s compliment math to enable same and requires the AC signal to deviate both positively and negatively with respect to the center or split rail voltage. The signal also enters the half cycle identifier 8.

Figure 5:
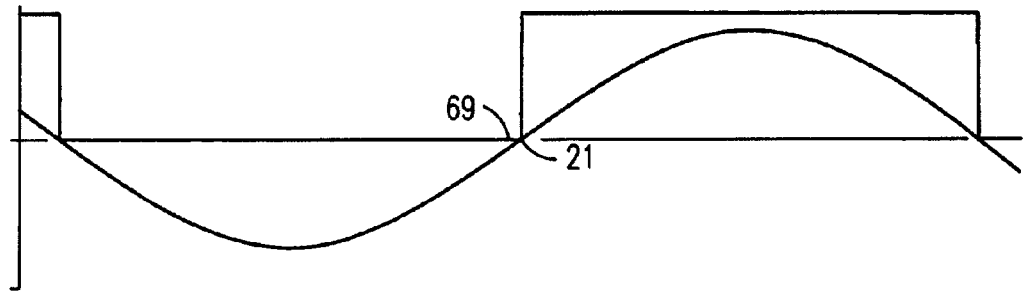
FIG. 5 is an oscillogram for a volts zero crossing point determining means of the present invention.
Figure 6:
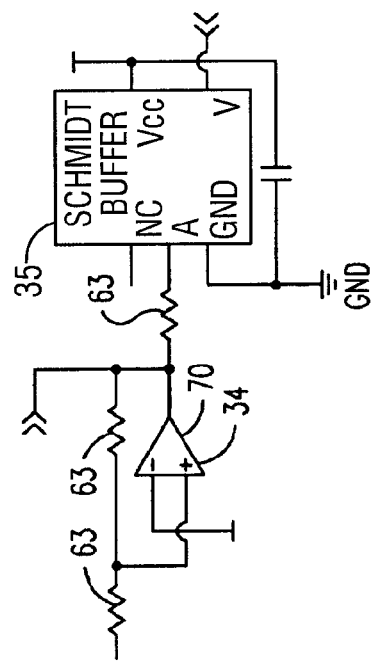
FIG. 6 is a circuit diagram for a volts zero crossing point determining means of the present invention.

FIGS. 5 and 6 show an oscillogram and circuitry diagram, respectively, for a volts zero crossing point determining means of the present invention. The volts zero crossing point determining means, which is preferably at least one volts zero crossing point detector 5 wherein the zero crossing point 21 is accurately determined. An operational amplifier 70 is configured as a comparator 34 with its reference at exactly half the supply voltage using half the supply rail. A comparator 34 operates at a very high gain and, as a result, switches within a few millivolts of the split rail voltage.

Additional conditioning of the zero cross signal is further performed by a Schmidt buffer 35. Subsequent to the additional signal processing, a very accurate square wave 69 accurate to a few millivolts of the actual volts zero crossing point 21 of the sine wave is produced.

Figure 7:
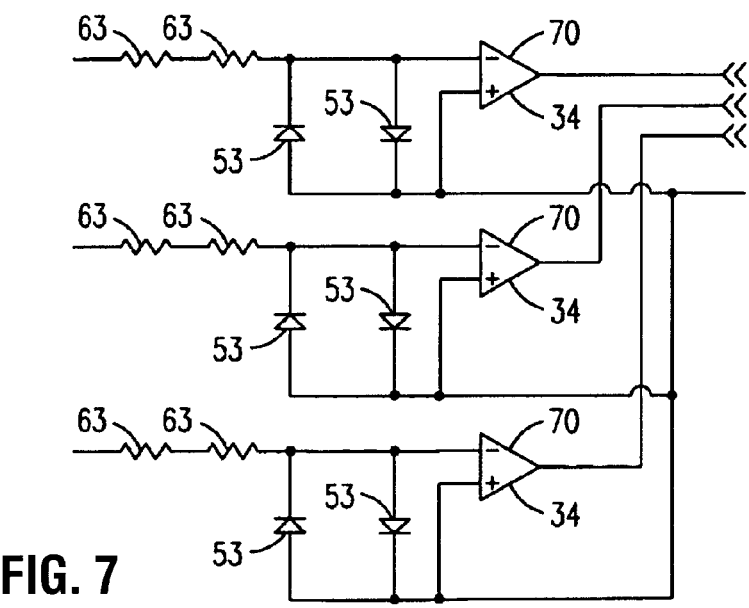
FIG. 7 is circuit diagram of a loss detecting means and phase rotation determination and rotating means of the present invention.

FIG. 7 shows a circuit diagram of a loss detecting means and phase rotation determination and rotating means of the present invention. The loss detecting means, which is preferably at least one lost phase detection device 6, and the phase rotation determination and rotating means, which is preferably at least one phase rotation device 7, work together so as to properly prepare the signal for transmittal into the logic device 9 and digital signal processor 10 when utilizing a three-phase electrical system. The lost phase detection device 6 circuitry includes operational amplifiers 70 configured as comparators 34 where each utilizes a high value of series resistors, comprising two 0.5 Meg Ohm resistors in series, which is necessary for achieving the required working voltage of the resistors 63, and two diodes 53 connected in inverse parallel. The diodes 53 are centered around the volts zero crossing point 21 of the incoming sine wave 39 at approximately the voltage forward drop of the diodes 53, which is in turn applied to the comparator 34 that further conditions the signal suitable for passing to the logic device 9 and digital signal processor 10, resulting in the system being shut down in the absence of any of the signals.

In a three-phase electrical system, the phase rotation maybe either A-B-C or A-C-B. To enable the digital signal processor 10 to properly function, the phase rotation must first be ascertained. The comparators 34 are used to detect the volts zero crossing point(s) 21 and report the point(s) 21 to the digital signal processor 10. The digital signal processor 10, in turn, makes the rotational timing through timing logic. Each of the operational amplifiers 70 act as a simple comparator 34 with the input signal, in each case provided by the inverse parallel pairs of diodes 53 in conjunction with the series resistors 63.

Figure 8:
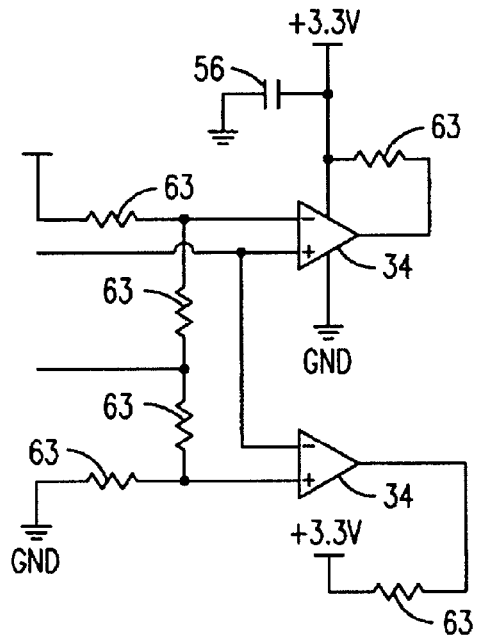
FIG. 8 is show a circuit diagram of a half cycle identifying means of the present invention.
Figure 9:
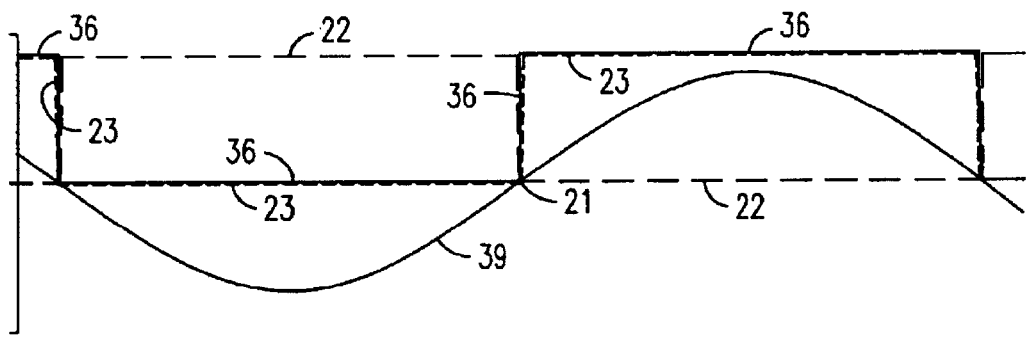
FIG. 9 is show an oscillogram of a half cycle identifying means of the present invention.
Figure 10:
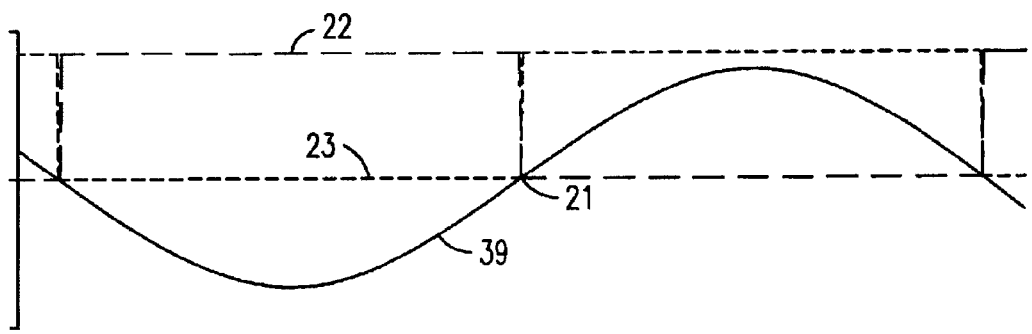
FIG. 10 is show an oscillogram of a half cycle identifying means of the present invention.

FIGS. 8, 9 and 10 show a circuit diagram and oscillograms, respectively, of a half cycle identifying means of the present invention. The half cycle identifying means, which is preferably at least one half cycle identifier 8, provides additional data to the logic device 9 and digital signal processor 10 by identifying whether the half cycle of the analog signal is positive or negative. This is of great importance to avoid a situation where if the IGBT/FET half cycle control transistors 54 and 58 and the IGBT/FET shunt control transistors 59, 60, 67 and 68 are simultaneously on, a short circuit would occur across the input power.

The operational amplifiers 70, which are configured as window comparators 34, have separate switching thresholds determined by at least one resistor 63. As shown in FIG. 9, there are three signals, an absolute zero cross signal 36 and two co-incident signals wherein one co-incident signal has a positive half cycle 22 and one co-incident signal has a negative half cycle 23 of an incoming sine wave 39. The design allows the window to be adjusted to provide, when required, the "dead band."

With reference to FIGS. 11A, 11B, 11C, 11D and 11E, circuit diagrams of the routing means of the present invention are shown. The routing means, which is preferably at least one logic device 9, works in real time, outside the digital signal processor 10, to arbitrate between the on-times of the IGBT/FET half cycle control transistors 54 and 58 and the IGBT/FET shunt control transistors 59, 60, 67 and 68.

Figure 11A:
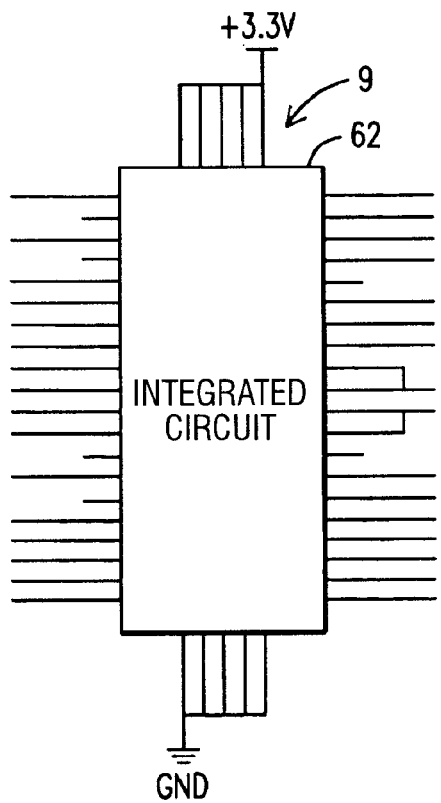
FIG. 11A is a circuit diagram of the routing means of the present invention.
Figure 11B:
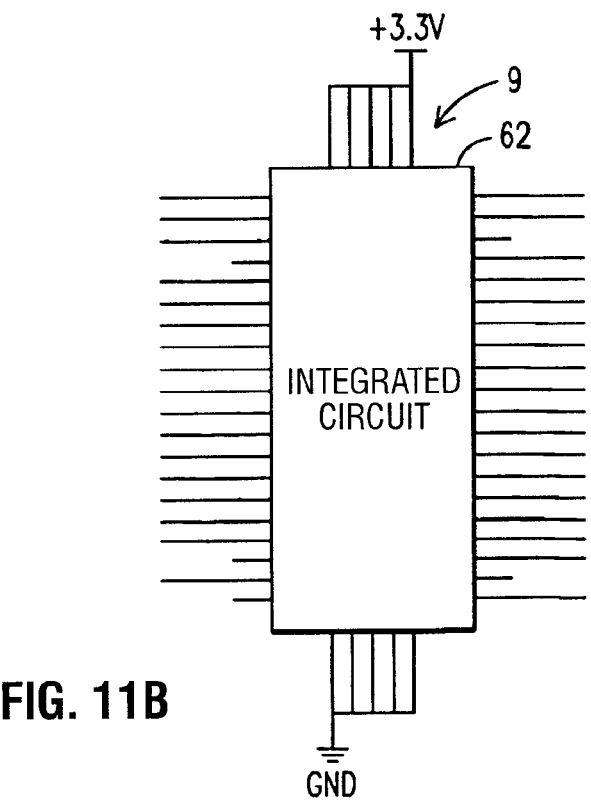
FIG. 11B is a continuation of the circuit diagram of FIG. 11A.
Figure 11C:
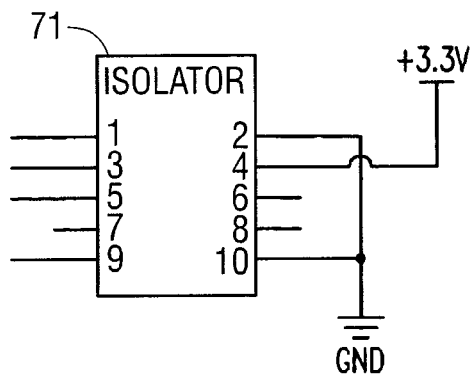
FIG. 11C is a circuit diagram of a ports programmer of FIGS. 11A and 11B.
Figure 11D:
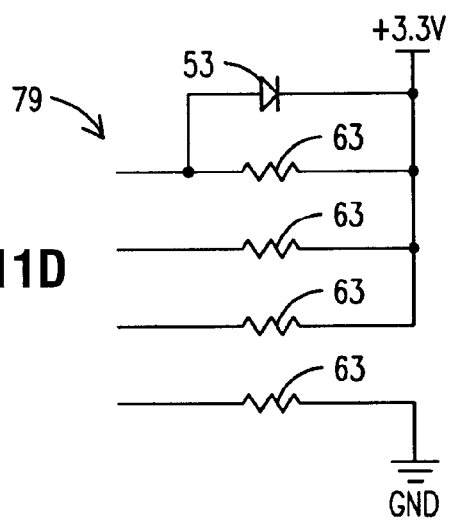
FIG. 11D is a circuit diagram of a resistor support of FIGS. 11A and 11B.
Figure 11E:
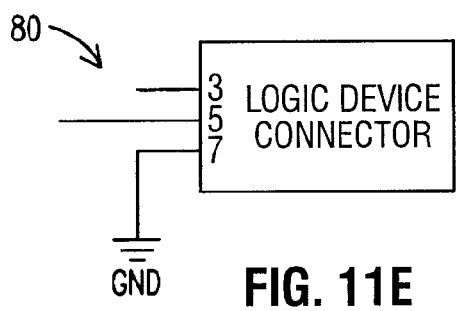
FIG. 11E is a circuit diagram of a connector of FIGS. 11A and 11B.

The logic device 9 performs the routing function to assure that all signals are appropriate to the instantaneous requirement and polarity of the incoming sine wave 39 and performs the pulse width modulation function so as to assure the safe operation of the energy savings device and system 1, regardless of the state of the digital signal processor 10, presence of noise, interference or transients. The circuitry of the isolator 71, as shown in FIG. 11C, permits programming of the logic device 9. The circuitry of the resistor support 79 of the logic device 9, as shown in FIG. 11D, is necessary to operate the logic device 9. As shown in FIG. 11E, the circuitry of the logic device connector 80 enables activation and deactivation of certain aspects of the logic device 9.

Dealing with a resistive load is much less demanding than dealing with a reactive load, in particular, an inductively reactive load. Currently, pulse width modulation (PWM) is defined as modulation of a pulse carrier wherein the value of each instantaneous sample of a modulating wave produces a pulse of proportional duration by varying the leading, trailing, or both edges of a pulse and which is also known as pulse-duration modulation. However, for purposes of this invention and application, PWM is defined as the modulation of a pulse carrier wherein at least one slice is removed from an area under the curve of a modulating wave. When PWM is applied directly to the incoming power, the inductive component reacts when power is removed and attempts to keep the current going and will raise its self-generated voltage until the current finds a discharge path. This circumstance, without the shunt circuitry, would destroy the half cycle control transistors.

Therefore, the logic device 9 is a "supervisor" wherein it takes the appropriate action should the digital signal processor 10 "hang-up", if there is an over-current condition or if there is a phase loss. In any of these situations, the logic device 9 responds immediately, in real time, to safeguard the half cycle control transistors and shunt devices and the equipment connected to it.

Additionally, the logic device 9 mitigates the complex drive requirements of the IGBT/FET half cycle control transistors 54 and 58 and the IGBT/FET shunt control transistors 59, 60, 67 and 68 and, to an extent, unloads the digital signal processor 10 of this task. Since the logic device 9 controls this function, it may be performed in real time and, therefore, the timing control of the drive requirements can be held to much stricter limits than would be achieved by the digital signal processor 10. The ability to respond in real time is important to the safe, reliable operation of the energy savings device and system 1 of the present invention.

Figure 12A:
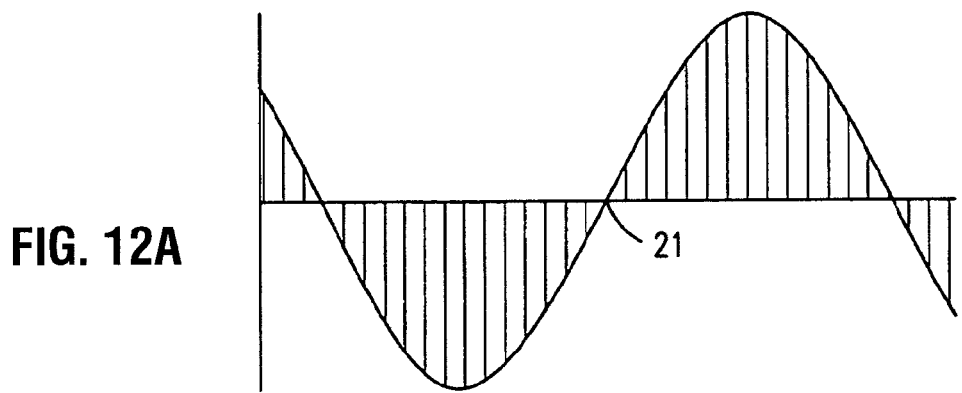
FIG. 12A is an oscillogram of a voltage reducing means of the present invention.

FIGS. 12A, 12B, 12C, 12D, 12E, 12F and 12G show oscillograms and circuit diagrams of a voltage reducing means of the present invention. The voltage reducing means, which preferably includes at least one IGBT/FET drive control 15, reduces the analog signals of the incoming sine wave 39, which is the amount of energy inputted into the energy savings device and system 1, by pulse width modulation wherein at least one slice is removed from an area under the curve of the modulating sine wave 39, thereby reducing energy and without the attendant harmonics previously associated with such voltage control. This technique, as shown in FIG. 12A, works in conjunction with the inherent characteristics of the IGBT/FET devices that allows the on and off triggering point to be controlled. All of the potential energy is contained in each half cycle and, in the case of a complete half cycle, has the greatest area under the curve. If each half cycle is modulated on a mark space ratio of 90%, the area under the curve is reduced by 10% and, as a result, the energy is reduced proportionally as seen in FIG. 12A.

The original shape of the input sine wave is retained and, since modulation can be made high, possibly 10's of KHz, filtering of the output is possible due to the smaller size of the wound components becoming a practical proposition. The overall effect is realized when the root-mean-square value (RMS), which is the square root of the time average of the square of a quantity or, for a periodic quantity, the average is taken over one complete cycle and which is also referred to as the effective value, is correctly measured and the output voltage is seen to be reduced by a percentage similar to the mark space ratio employed. Reduced voltage results in reduced current, thereby resulting in reduced power consumed by an end user.

Since IGBT and FET devices are unipolar in nature, in the case of AC control, it is necessary to provide at least one IGBT/FET drive control 15 to control each half cycle. Furthermore, to avoid reverse biasing, steering diodes are used to route each half cycle to the appropriate device. Additionally, many IGBT and FET devices have a parasitic diode shunting main element wherein connecting two IGBT or FET devices in inverse parallel would result in having two of the parasitic diodes in inverse parallel, thereby rendering the arrangement inoperative as a controlling element.

The diodes 53 are connected across the positive half cycle transistor 54 and the negative half cycle control transistor 58 and works ideally for a purely resistive load or a current-leading reactive load. However, when driving a load with a current lagging power factor, when the current in an inductively reactive component is suddenly removed, as is the case when the modulation occurs, the collapsing magnetic field attempts to keep the current going, similar to an electronic fly-wheel, and produces an EMF that will rise in voltage until it finds a discharge path that will enable release of the energy. With this arrangement, this "back EMF" would cause active components of the half cycle control element to fail. To prevent this from occurring, additional IGBT/FET shunt control transistors 59, 60, 67 and 68 are placed in a shunt configuration.

During the positive half cycle, the positive half cycle control transistor 54 modulates and a diode 53 is active during the complete positive half cycle. The IGBT second shunt control transistor 60 is turned fully on and a diode 53 is active. Therefore, any opposite polarity voltages resulting from the back EMF of the load are automatically clamped.

During the negative half cycle, the other devices comprised in series and shunt networks are activated in a similar manner.

During the switching transitions, a spike may be present which may last for a very short period of time. The spike is clamped by the transorb devices 52, which are capable of absorbing large amounts of energy for a very short period of time and enables vary fast response time. The transorb devices 52 also clamp any mains bourn transient signals due to lightning strikes or other sources that could otherwise damage the active components of the half cycle transistors or shunt transistors. Further, while each half cycle transistor is pulse width modulating, the other half cycle transistor is turned fully on for the precise duration of the half cycle. The duties of these half cycle transistors reverse during the next half cycle. This process provides complete protection against the back EMF signals discussed above. This arrangement is necessary, especially near the zero crossing time when both shunt elements are in transition.

Each of the IGBT/FET half cycle control transistors 54 and 58 and the IGBT/FET shunt control transistors 59, 60, 67 and 68 have insulated gate characteristics that require the devices to be enhanced to enable them to turn on. This enhancement voltage is preferably 12 Volts in magnitude and is preferably supplied by a floating power supply, preferably one for each pair. This is only possible since the IBGT/FET devices are operated in the common emitter mode in the case of the IGBT's and in the common source mode in the case of the FET's; otherwise, four isolated power supplies would be required for each phase. Each of the pairs requires a separate drive signal that is provided by the isolated, optically-coupled drivers 66. These drivers 66 make use of the isolated supplies and serve to very rapidly turn-on and turn-off each power device. These drivers 66 are active in both directions, which is necessary since the input capacitance of the power devices are high and have to be actively discharged rapidly at the turn-off point and charged rapidly at the turn-on point.

Figure 12B:
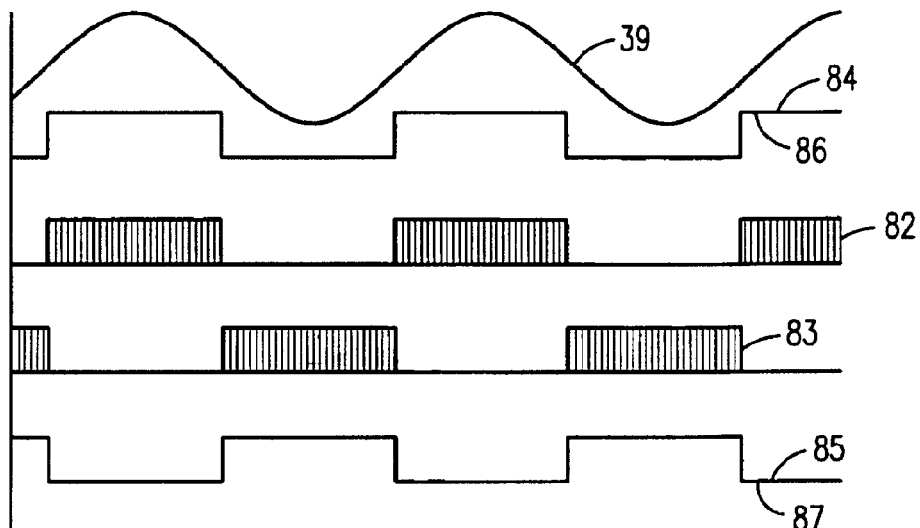
FIG. 12B is an oscillogram of a voltage reducing means of the IGBT-based present invention.
Figure 12C:
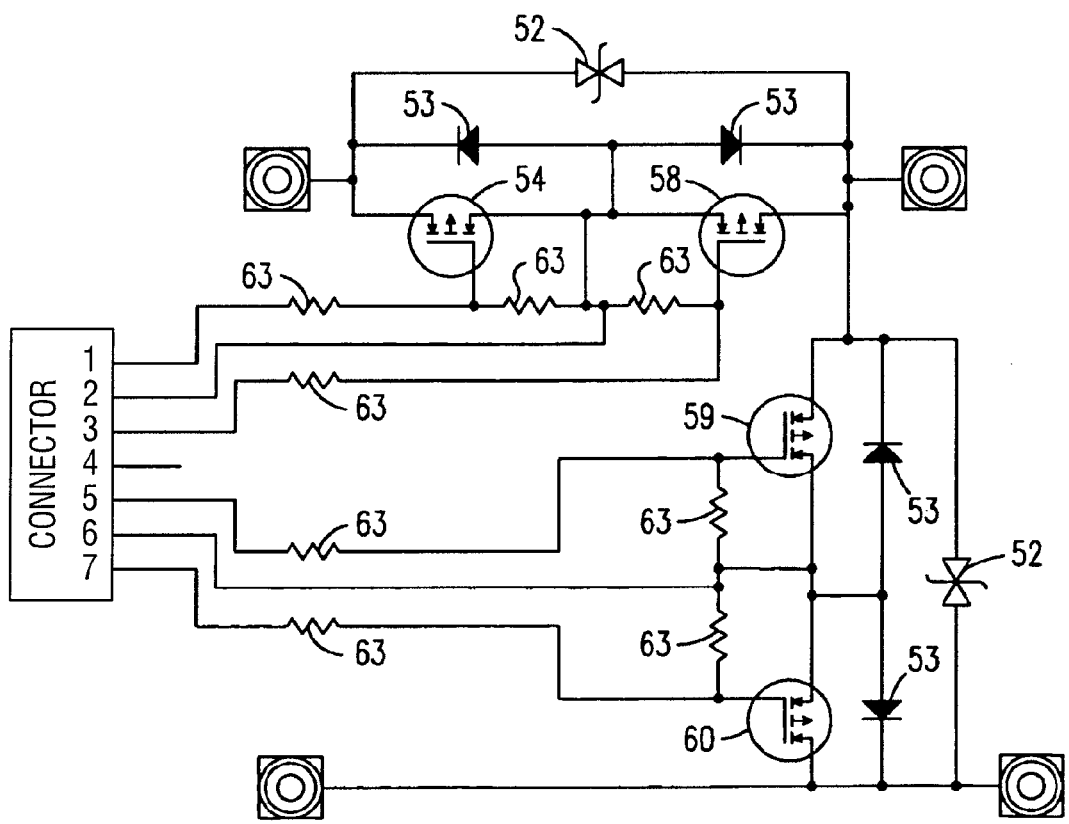
FIG. 12C is a circuit diagram of an IGBT-based voltage reducing means of the present invention.
Figure 12D:
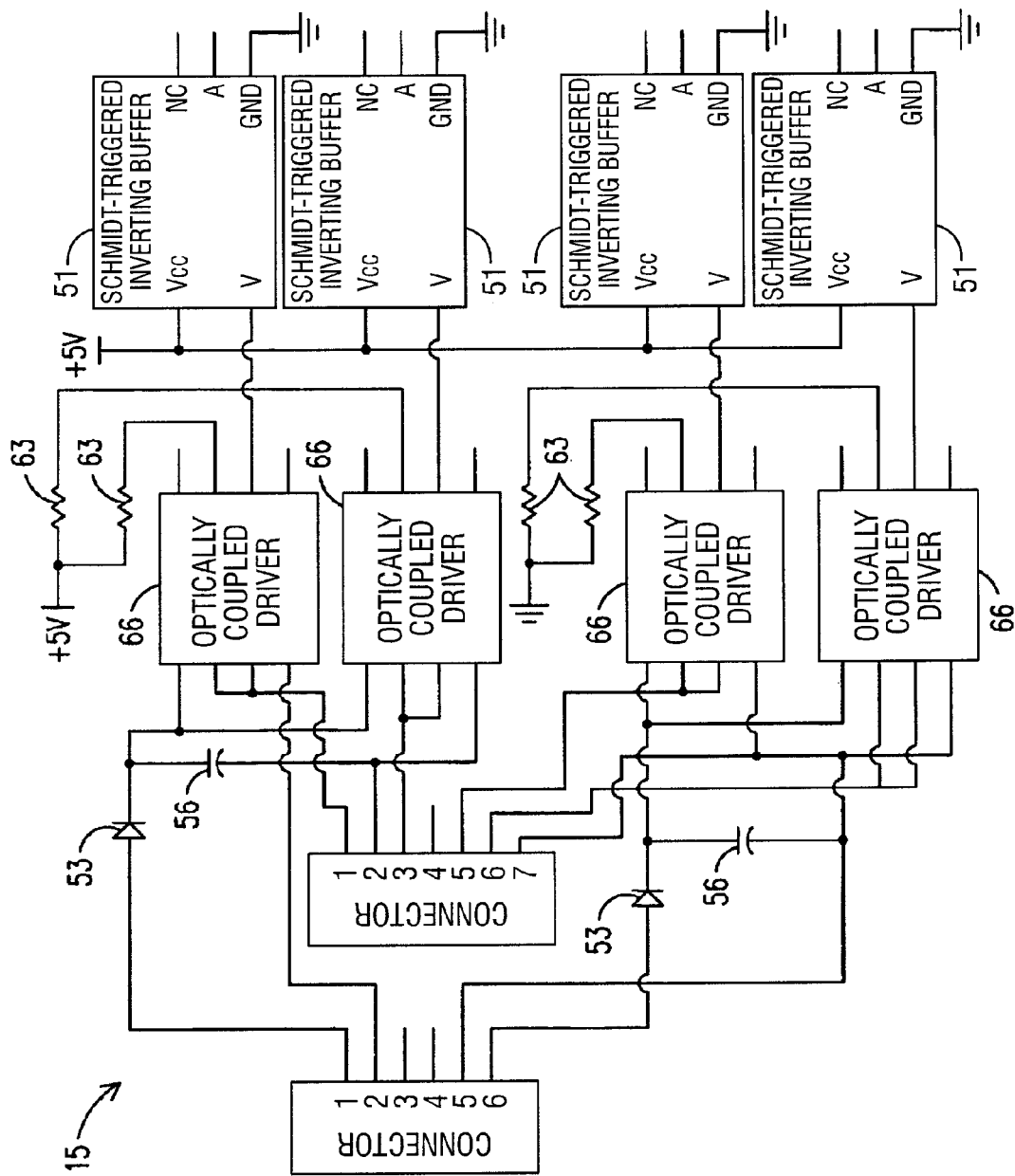
FIG. 12D is a circuit diagram of a drive circuitry for the IGBT-based voltage reducing means of FIG. 12C.

The problem with direct pulse width modulation is when driving an inductively reactive load as when the IGBT modulates off, there is a back EMF that needs to be clamped. Referring to FIG. 12B, an incoming sine wave 39 that is applied to the positive half cycle control transistor 54 and the negative half cycle control transistor 58 is shown. Normally, these half cycle control transistors 54 and 58 are in the "off" condition and need to be driven on. During the positive half cycle, the positive half cycle control transistor 54 is modulated and works in conjunction with a diode 53 to pass the modulated positive half cycle to a line output terminal. The IGBT second shunt control transistor 60 is on for the duration of the half cycle and operates in conjunction with a diode 53 so as to clamp the back EMF to ground. During the positive half cycle, the negative half cycle control transistor 58 is turned on fully and its on condition is supported by a diode 53. These diodes 53 perform the appropriate steering of the signals.

Due to modulation of the positive half cycle, a back EMF signal occurs. Since the negative half cycle control transistor 58 is on during this time, the negative back EMF is passed through a diode 53 to be clamped at the simultaneous AC positive half cycle voltage.

Although no modulation is applied to the IGBT first shunt control transistor 59 and the IGBT second shunt control transistor 60, these transistors 59 and 60 work in conjunction with diodes 53 in a similar manner as set forth above.

As shown in FIG. 12B, which is an oscillogram of the voltage reducing means of the IGBT-based present invention, during the positive half cycle 22, a drive signal is applied to the negative half cycle control transistor 85 and a drive signal is applied to the IGBT second shunt control transistor 87. During the negative half cycle 23, a drive signal is applied to the positive half cycle control transistor 84 and a drive signal is applied to the IGBT first shunt control transistor 86. The positive half cycle drive signal 82 applied to the positive half cycle control transistor 54 and the negative half cycle drive signal 83 applied to the negative half cycle control transistor 58 are also shown.

Figure 12E:
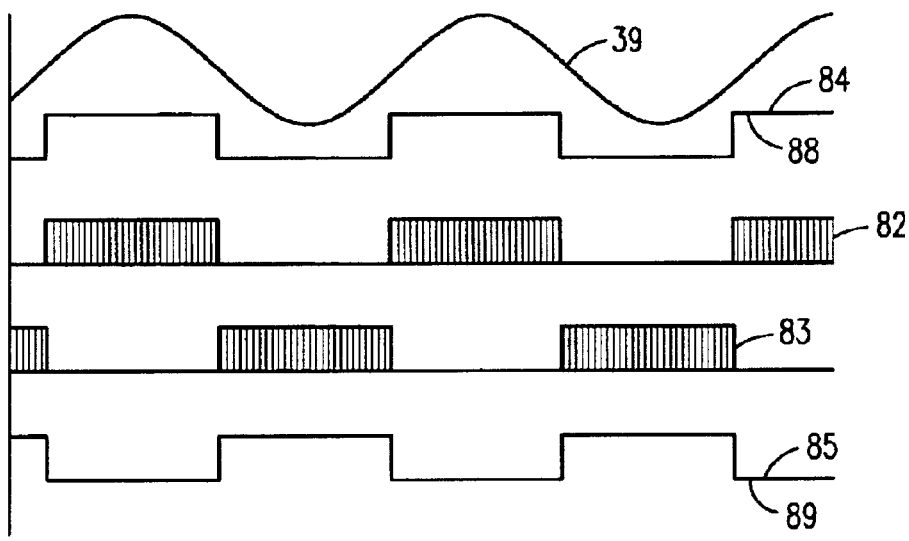
FIG. 12E is a oscillogram of a voltage reducing means of the FET-based present invention.

Similarly, as shown in FIG. 12E, which is an oscillogram of the voltage reducing means of the FET-based present invention, during the positive half cycle 22, a drive signal is applied to the negative half cycle control transistor 85 and a drive signal is applied to the FET second shunt control transistor 89. During the negative half cycle 23, a drive signal is applied to the positive half cycle control transistor 84 and a drive signal is applied to the FET first shunt control transistor 88. The positive half cycle drive signal 82 applied to the positive half cycle control transistor 54 and the negative half cycle drive signal 83 applied to the negative half cycle control transistor 58 are also shown.

In summary, there are two clamping stratagem used, the first for the positive half cycle and the second for the negative half cycle. During the positive half cycle, when the positive half cycle control transistor 54 is modulated, the negative half cycle control transistor 58 and the second shunt control transistor 60 are on. During the negative half cycle, when the negative half cycle control transistor 58 is modulated, the positive half cycle control transistor 54 and the IGBT first shunt control transistor 59 are on.

Figure 12F:
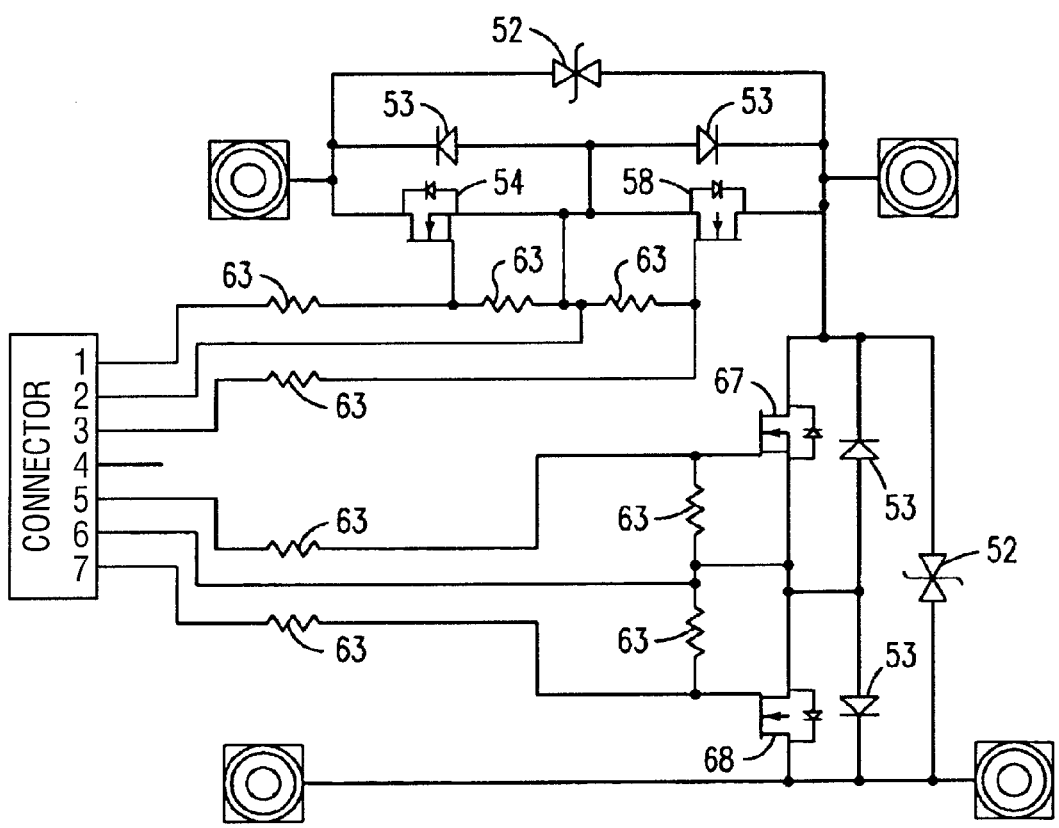
FIG. 12F is a circuit diagram of a FET-based voltage reducing means of the present invention.
Figure 12G:
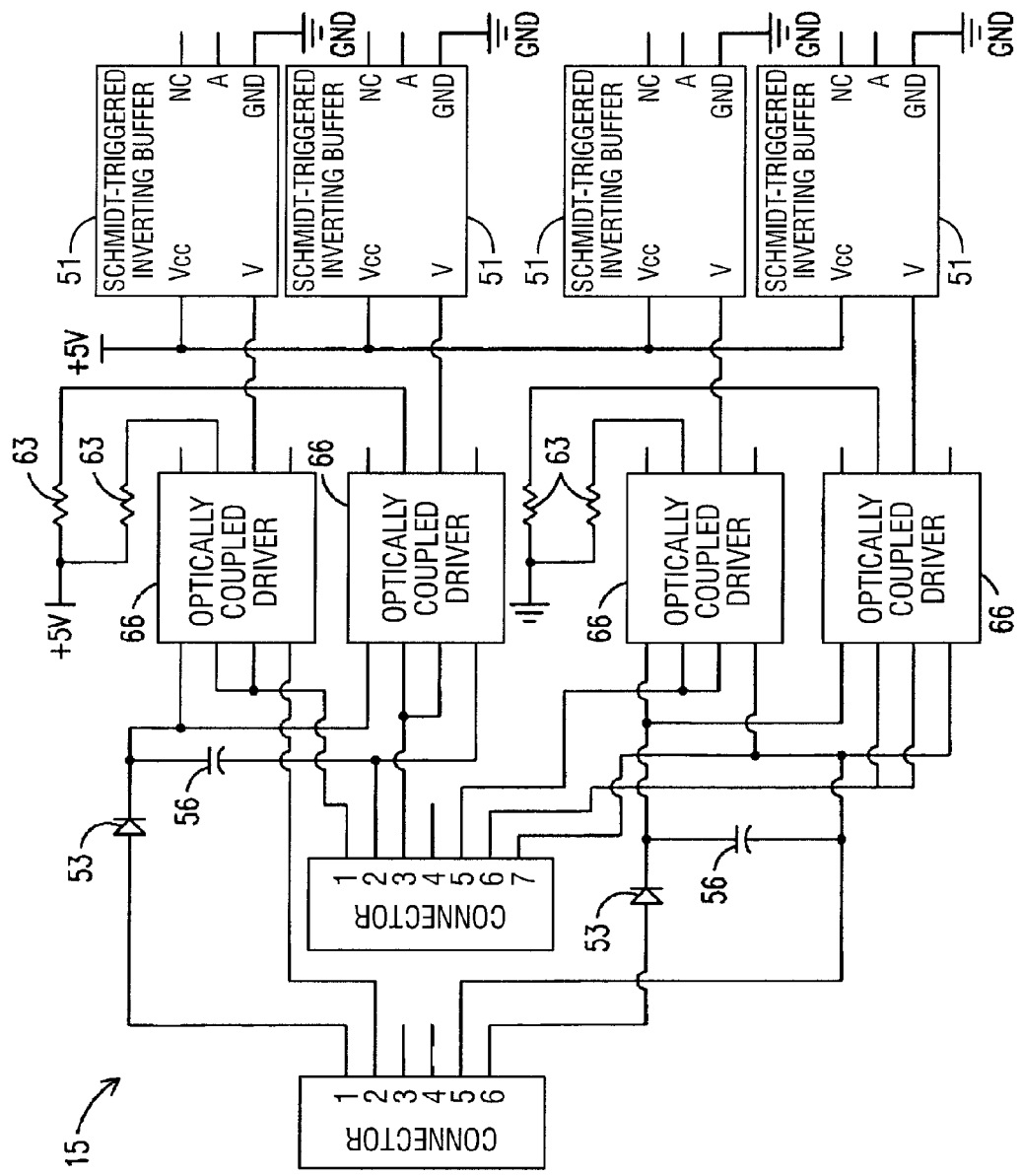
FIG. 12G is a circuit diagram of a drive circuitry for the FET-based voltage reducing means of FIG. 12F.

The hardware utilized in the IGBT-based and FET-based energy savings device and method 1 of the present invention is identical with the only difference being the IGBT/FET half cycle control transistors 54 and 58 and the IGBT/FET shunt control transistors 59, 60, 67 and 68. The circuitry diagrams of the IGBT-based circuitry FIG. 12C and the IGBT-based driver FIG. 12D and the FET-based circuitry FIG. 12E and the FET-based driver FIG. 12F are shown for comparison purposes.

Figure 13:
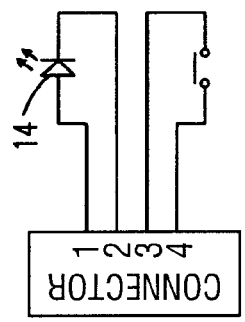
FIG. 13 a circuit diagram of a combined resetting means and indicator means of the present invention.

With reference to FIG. 13, a circuit diagram of a combined resetting means and indicator means of the present invention is shown. The resetting means, which is preferably at least one reset switch 13, and indicator means, which is preferably at least one light emitting diode 14, work together so as to indicate when the IGBT/FET-based energy savings device and system 1 is not properly working and to permit a user to reset the device and system 1 as needed. Preferably, the light emitting diode 14 will indicate that the device and system 1 is working properly by flashing on/off. When in a fault condition, the light emitting diode 14 preferably changes to an uneven pattern that is immediately obvious and recognizable as a fault condition.

Figure 14A:
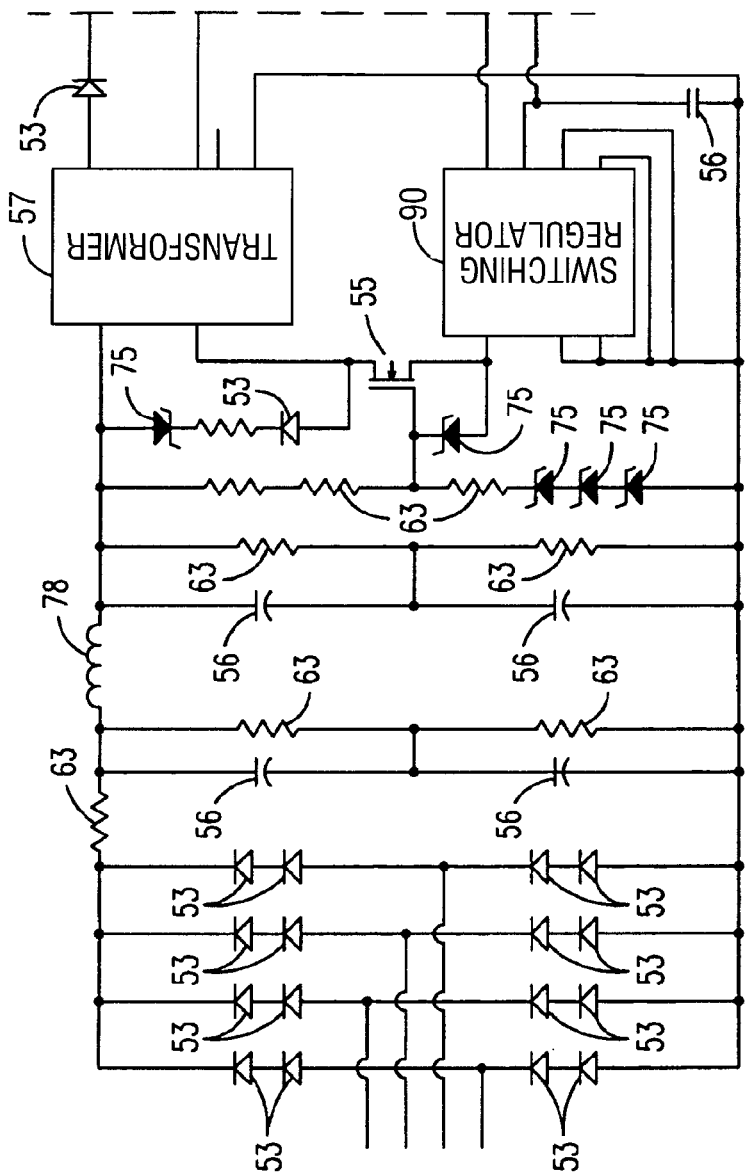
FIG. 14 is a circuit diagram of a power supply unit of a powering means of the present invention.
Figure 14B:
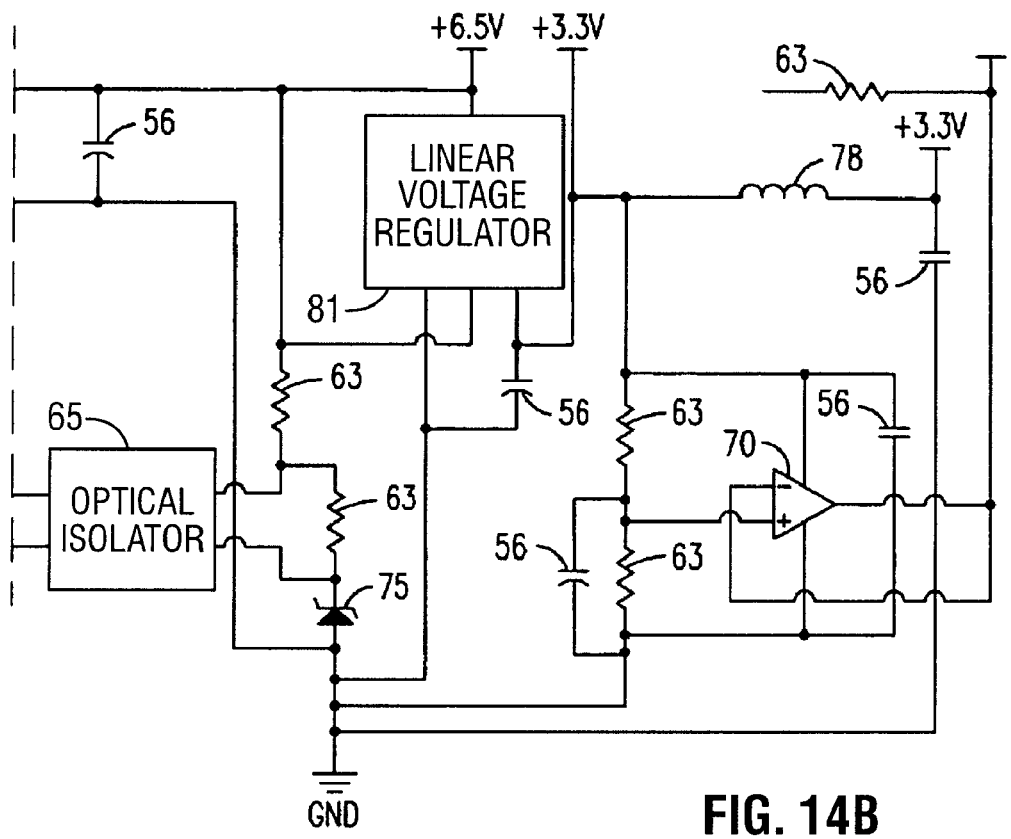

FIG. 14 is a circuit diagram of a power supply unit 12 of a powering means of the present invention. The powering means, which is preferably at least one power supply unit 12, accepts a variety of inputs, including, but not limited to, single phase 80 Vrms to 265 V$_{rms}$, bi-phase 80V$_{rms}$ to 600V$_{rms}$, three-phase 80V$_{rms}$ to 600V$_{rms}$ and 48 Hz to 62 Hz operation.

The power supply unit 12 is fully-isolated and double-regulated in design. At the input, a rectifier 72 composed of diodes 53 accepts single, bi- and three-phase power. The power is applied to a switching regulator 90 and integrated circuit 62 via a transformer 57. In view of the large voltages existing across the DC terminals, the switching regulator 90 and integrated circuit 62 is supplemented by a FET transistor 73 employed in a StackFET configuration in order to raise its working voltage. The secondary of transformer 57 has a diode 53 and a reservoir capacitor 56. The DC voltage across capacitor 56 is passed via the network resistors 63 and a Zener diode 75 to an optical isolator 65 and finally to the feedback terminals. Use of the optical isolator 65 guarantees galvanic isolation between the input and the supply output (6.4V DC). Finally, the output of the linear voltage regulators 81 (3.3VA DC) is passed to a operational amplifier 70, which is configured as a unity gain buffer with two resistors 63 that set the split rail voltage. The main neutral is connected to this split rail point and also a zero Ohm resistor. An inductor 78 isolates the supply rail digital (+3.3V) from the analog (3.3VA) and reduce noise.

Next, FIGS. 15A, 15B, 15C, 15D and 15E show the circuitry of a communication means of the present invention. The communication means, which is preferably at least one USB communications interface 25, permits a user to monitor and set the parameters of the energy savings device and system 1 of the present invention as desired.

Figure 15B:
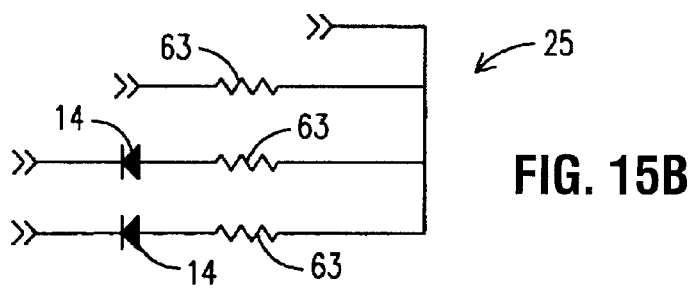
FIG. 15B is a circuit diagram of a USB interface of a communications means of FIG. 15A.
Figure 15C:
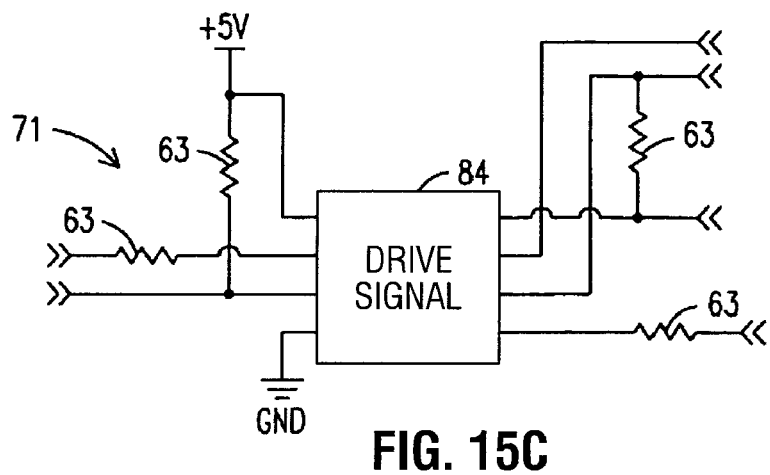
FIG. 15C is a circuit diagram of an isolator block of a communications means of FIG. 15A.

The circuitry of a USB communications interface 25 is shown in FIG. 15B, an isolator block 71 utilized in isolating the USB communications interface 25 from the digital signal processor 10 is shown in FIG. 15C and first and second connectors 76 and 77 for connecting the communications means to the digital signal processor 10 are shown in FIGS. 15D and 15E.

Since the main printed circuit board is not isolated from neutral, it is necessary to galvanically isolate the USB communications interface 25. Use is made of the built-in serial communications feature of the digital signal processor 10 to serially communicate with the communication means 46. Signals, on the user side of the isolation barrier, are applied to an integrated circuit 62, which is a device that takes serial data and translates it to USB data for direct connection to a computing device 16 via a host USB port 74. The host USB 5V power is used to power the communication means 46 and voids the necessity of providing isolated power from the unit. Preferably, there are two activity light emitting diodes 14, that indicate activity on the TX (transmit) and RX (receive) channels. Communications preferably operates at 9600 Baud, which is adequate in view of the small amount of data passed.

Although the inclusion of a communications means is not necessary in the performance of the energy savings device and system 1, it is a feature that permits easier use of the device and system 1.

Figure 16:
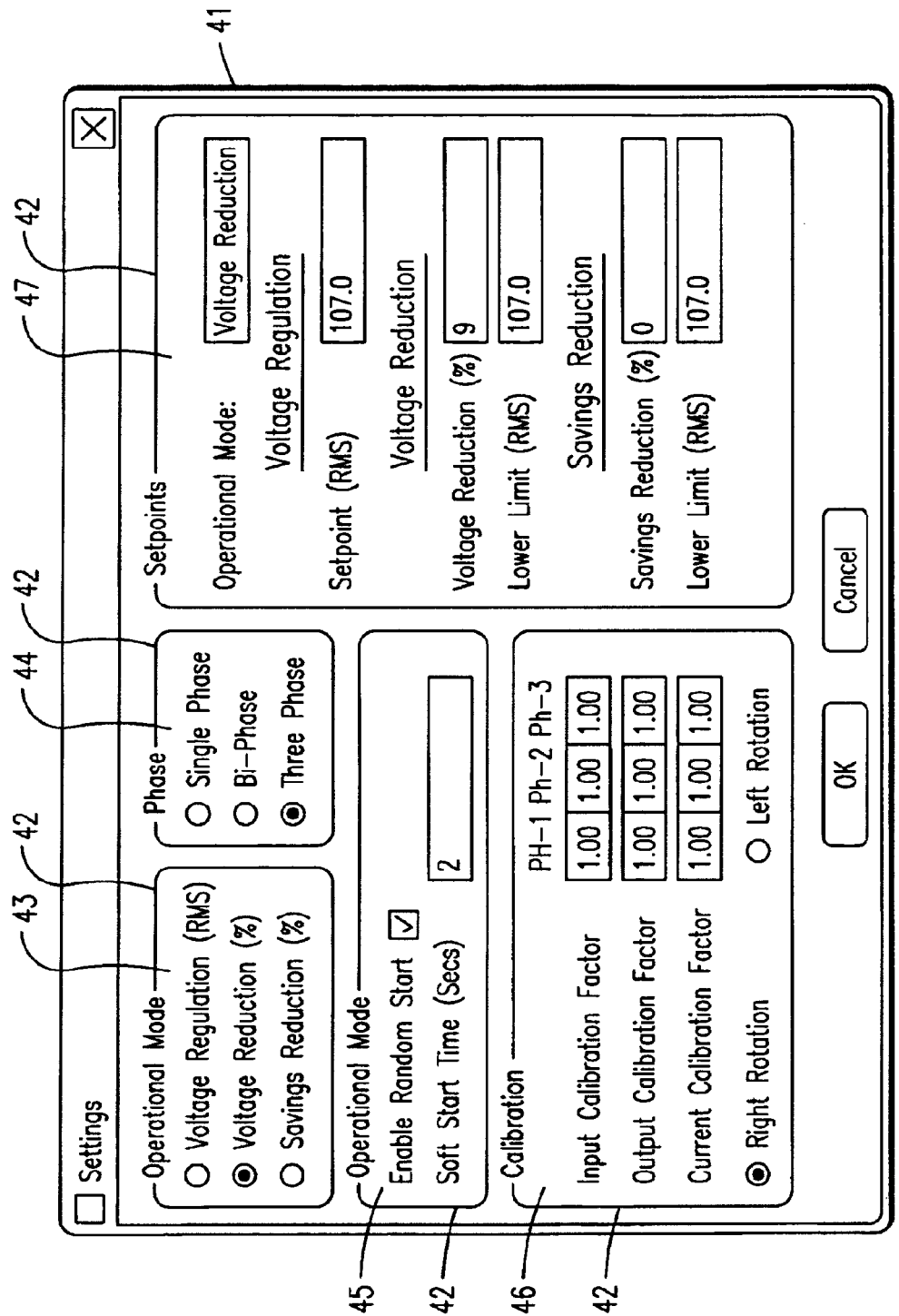
FIG. 16 is a screen shot of a windows interface of the present invention.
Figure 17:
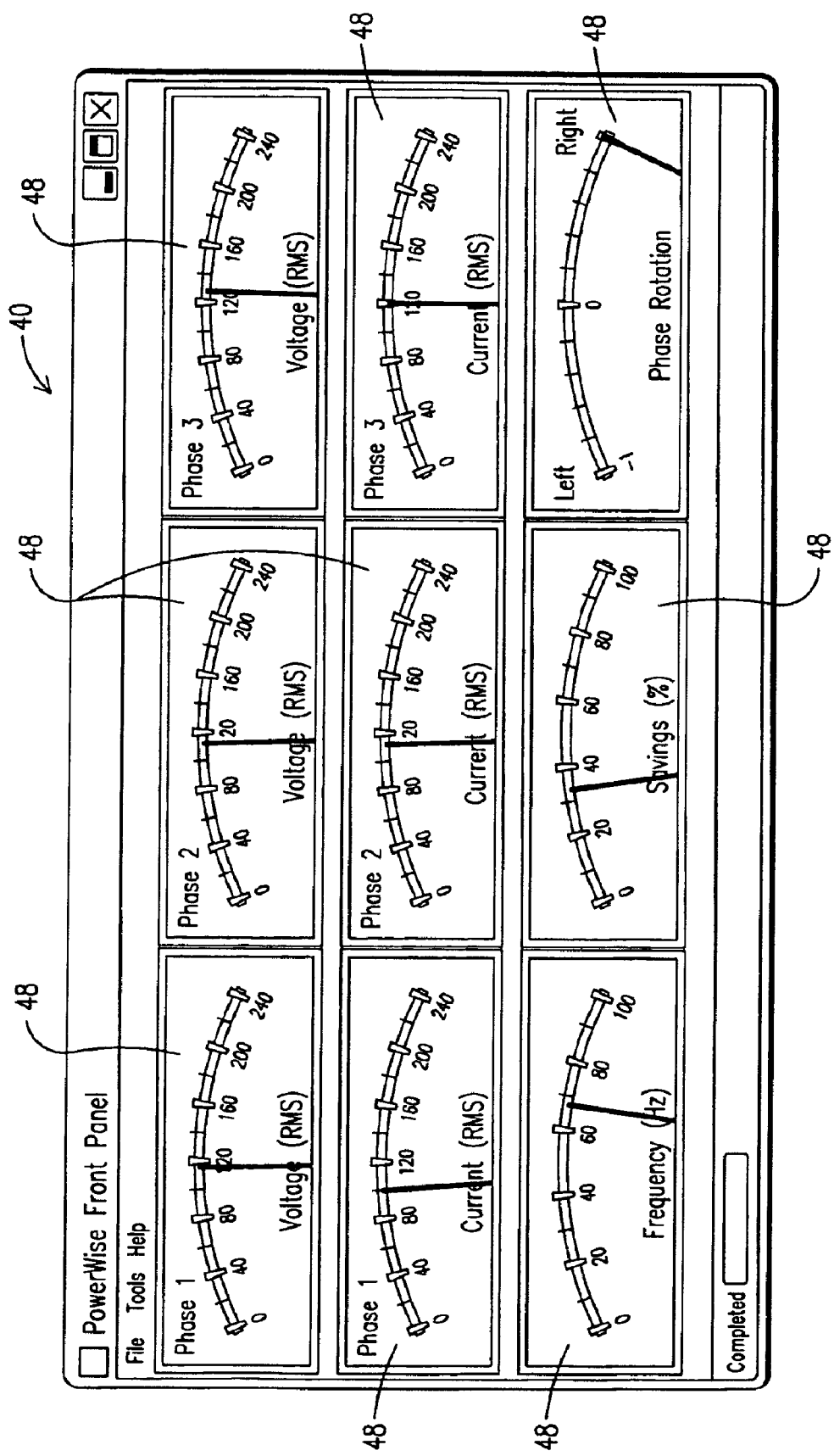
FIG. 17 is a screen shot of a windows interface of the present invention.

Finally, with reference to FIGS. 16 and 17, screen shots of a windows interface 40 of the present invention are shown. The windows interface 40 is displayed on the computing device 16 and permits a user to monitor and configure the energy savings device and system 1 as desired. A main monitoring screen 41 having a plurality of fields 42 in which an end user may adjust the energy savings device and system 1 are provided. For example, the fields 42 may include an operational mode field 43, a phase field 44, a startup field 45, a calibration field 46 and a setpoints field 47.

In the operational field 43, a user may select the manner in which he/she/it desires to conserve energy. The manners include voltage reduction percentage wherein the output Volts is adjusted by a fixed percentage, savings reduction percentage wherein the output Volts is aimed at achieving a savings percentage and voltage regulation wherein the root mean squared Volts output is a pre-set value.

The phase field 44 permits a user to select the phase type used in connection with the energy savings device and system 1, i.e., single phase, bi-phase or three phase.

The startup field 45 permits a user to configure the system and device 1 to randomly start and/or to have a delayed or "soft start" wherein the user input the delay time in seconds in which the system and device will start.

The calibration field 46 permits a user to input the precise calibrations desired and/or to rotate the phases.

The setpoints field 47 displays the settings selected by the user and shows the amount of energy saved by utilizing the energy savings device and system 1 as voltage regulation, voltage reduction percentage or power savings reduction percentage. With respect to percentage voltage reduction, the lower limit RMS is set below the incoming voltage passed therethrough to permit the incoming voltage to be passed through when it is less than or equal to the lower limit voltage. With respect to the percentage savings reduction, the lower limit RMS is set below the incoming voltage passed therethrough.

Indicators 48 are provided on the windows interface 40 display operating current, operating voltage, line frequency, calculated power savings and phase rotation.

A real time clock 49 may be incorporated into the windows interface 40 to allow programming of additional voltage reduction for a predetermined time and a predetermined operational time, e.g., for seasons, days of the week, hours of the day, for a predetermined operational time. In addition, a user may program the energy savings device and system 1 to operate during various times of the day. The real time clock 49 is set through a communications port or fixed to allow the selection of defined seasonal dates and time when, through experience, are known to exhibit power grid overload. During these times, the system allows further reduction of the regulated AC voltage, thereby reducing the load on the grid. Multiple time can be defined each with its own additional percentage reduction or voltage drop.

The digital electricity meter 50 provides a means to log statistical data on power usage, power factor and surges. The digital electricity meter 50 also provides the ability to include capacitors for power factor correction, operates on single, bi and three-phase systems and operates on all world wide voltages. It may be used remotely or locally to disable or enable the user's power supply at will by the provider. In addition, the digital electricity meter 50 may detect when the energy savings device and system 1 has been bridged by an end user attempting to avoid paying for energy consumption wherein the provider is alerted to such abuse. Finally, use of the real time clock 49 permits a user and/or provider to reduce the consumption of power at selected times of a day or for a selected time period, thereby relieving and/or eliminating brown-out conditions.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:

1. An IGBT/FET-based energy savings device comprising:
   at least one phase input connection for inputting a predetermined amount of incoming energy having at least one analog signal into said energy savings device, wherein said at least one analog signal is an AC signal;
   at least one sensing means connected to said at least one phase input connection for sensing said predetermined amount of incoming energy entered into said energy savings device;
   at least one volts zero crossing point detector in electrical connection with said at least one phase input connection for determining at least one zero volts crossing point of said at least one analog signal;
   at least one half cycle identifier in electrical connection with said at least one phase input connection for identifying at least one positive half cycle of said at least one analog signal and at least one negative half cycle of said at least one analog signal;
   at least one logic device in electrical connection with said at least one volts zero crossing point detector and at least one half cycle identifier for routing said at least one positive half cycle of said at least one analog signal and said at least one negative half cycle of said at least one analog signal to at least one digital signal processor for processing said at least one analog signal;
   said at least one digital signal processor in electrical connection with said at least one logic device for processing said at least one analog signal;
   at least one voltage reducing means having at least one drive control wherein said at least one voltage reducing means is in electrical connection with said at least one digital signal processor for reducing said predetermined amount of incoming energy by providing pulse width modulation to the at least one analog signal to yield a reduced amount of energy; and
   at least one phase output connection in electrical connection with said at least one voltage reducing means for outputting said reduced amount of energy out of said energy savings device;
   wherein said at least one drive control comprises a first IGBT/FET device configured for providing pulse width modulation to said at least one positive half cycle of said at least one analog signal, a second IGBT/FET device configured for providing pulse width modulation to said at least one negative half cycle of said at least one analog signal, and a first IGBT/FET shunt control transistor and a second IGBT/FET shunt control transistor configured as routing switches to clamp a back electromagnetic field;
   wherein a first diode is connected across said first IGBT/FET device, and a second diode is connected across said second IGBT/FET device;
   wherein said second diode is configured to be conducting said at least one positive half cycle of said at least one analog signal and said second IGBT/FET device is configured to be in an on condition when said first IGBT/FET device is providing pulse width modulation, and said first diode is configured to be conducting said at least one negative half cycle of said at least one analog signal and said first IGBT/FET device is configured to be in an on condition when said second IGBT/FET device is providing pulse width modulation; and
   wherein said first IGBT/FET shunt control transistor is configured to be in an on condition when said first IGBT/FET device is providing pulse width modulation, and said second IGBT/FET shunt control transistor is configured to be in an on condition when said second IGBT/FET device is providing pulse width modulation.

2. The IGBT/FET-based energy savings device of claim 1 further comprising:
   at least one analog signal conditioning device for conditioning said at least one analog signal of said energy exiting said at least one sensing means;
   wherein said at least one logic device is configured to work in real time to insure that said second IGBT/FET shunt control transistor is in an off condition and said second IGBT/FET device and said first IGBT/FET shunt control transistor are in an on condition when said first IGBT/FET device is providing pulse width modulation; and
   wherein said at least one logic device is configured to insure that said first IGBT/FET shunt control transistor is in an off condition and said first IGBT/FET device and said second IGBT/FET shunt control transistor are in an on condition when said second IGBT/FET device is providing pulse width modulation.

3. The IGBT/FET-based energy savings device of claim 2, wherein said at least one logic control device is configured to receive an over-current condition from said sensing means and to shut down said IGBT/FET-based energy savings device in response.

4. The IGBT/FET-based energy savings device of claim 3 further comprising:
   at least computing device in electrical connection with said energy savings device;
   a first isolated optically coupled driver configured to turn-on and turn-off said first IGBT/FET device;
   a second isolated optically coupled driver configured to turn-on and turn-off said second IGBT/FET device;
   a third isolated optically coupled driver configured to turn-on and turn-off said first IGBT/FET shunt control transistor; and
   a fourth isolated optically coupled driver configured to turn-on and turn-off said second IGBT/FET shunt control transistor.

5. The IGBT/FET-based energy savings device of claim 4, wherein said at least one sensing means comprises a magnetic flux concentrator that is configured to measure said predetermined amount of incoming energy via galvanic isolation; and
   wherein said sensing means further comprises two comparators configured as a window comparator to pass a signal to said logic device in an over current condition.

6. The IGBT/FET-based energy savings device of claim 5, further comprising:
   a first transorb device connected across said first and second IGBT/FET devices.

7. The IGBT/FET-based energy savings device of claim 6, further comprising
   a third diode connected across said first IGBT/FET shunt control transistor;
   a fourth diode connected across said second IGBT/FET shunt control transistor; and
   a second transorb device connected across said first and second IGBT/FET shunt control transistors.

8. The IGBT/FET-based energy savings device of claim 7 wherein:
   said first shunt control transistor is configured to shunt said third diode when said first shunt control transistor is in an on condition; and
   said second shunt control transistor is configured to shunt said fourth diode when said second shunt control transistor is in an on condition.

9. The IGBT/FET-based energy savings device of claim 2 wherein:
said at least one analog signal conditioning device has a first filter for removing or reducing harmonics and transients or interfering signals of said energy exiting said at least one magnetic flux concentrator.

10. The IGBT/FET-based energy savings device of claim 9 wherein:
said at least one analog signal conditioning device has a second filter for permitting at least one phase change if necessary.

11. The IGBT/FET-based energy savings device of claim 1 wherein:
said at least one sensing means is a magnetic flux concentrator that measures said predetermined amount of energy via galvanic isolation.

12. The IGBT/FET-based energy savings device of claim 11 wherein:
said magnetic flux concentrator is located on at least one printed circuit board;
said at least one printed circuit board is located on at least one housing; and
said housing is removably securable to a conductor electrically connecting said at least one phase input connection to said at least one analog signal conditioning device.

13. The IGBT/FET-based energy savings device of claim 12 wherein:
said at least one housing includes a top half and a bottom half hingedly secured to one another.

14. The IGBT/FET-based energy savings device of claim 1 wherein:
said at least one volts zero crossing point detector for determining at least one volts zero crossing point of said at least one analog signal is at least one comparator and at least one Schmidt buffer.

15. The IGBT/FET-based energy savings device of claim 14 wherein:
said at least one comparator has a reference point of approximately half a supply voltage.

16. The IGBT/FET-based energy savings device of claim 1 further comprising:
at least one lost phase detection device in elecrtrical connection with said at least one analog signal conditioning device.

17. The IGBT/FET-based energy savings device of claim 16 further comprising:
at least one phase rotation device in electrical connection with said at least one analog signal conditioning device.

18. The IGBT/FET-based energy savings device of claim 1 further comprising:
at least one phase rotation device in electrical connection with said at least one analog signal conditioning device.

19. The IGBT/FET-based energy savings device of claim 1 wherein:
said at least one half cycle identifier identifies an absolute zero cross signal.

20. The IGBT/FET-based energy savings device of claim 1 wherein:
said at least one logic device is programmable.

21. The IGBT/FET-based energy savings device of claim 1 wherein:
said at least one logic device operates in real-time.

22. The IGBT/FET-based energy savings device of claim 1 further comprising:
at least one floating power supply in electrical connection with said at least one voltage reducing means.

23. The IGBT/FET-based energy savings device of claim 1 wherein:
said at least one phase output connection is a single phase output system.

24. The IGBT/FET-based energy savings device of claim 1 wherein:
said at least one phase output connection is a bi-phase output system.

25. The IGBT/FET-based energy savings device of claim 1 wherein:
said at least one phase output connection is a three-phase output system.

26. The IGBT/FET-based energy savings device of claim 1 further comprising:
a first transorb device connected across said first and second IGBT/FET devices.

27. The IGBT/FET-based energy savings device of claim 26 further comprising:
a third diode connected across said first IGBT/FET shunt control transistor;
a fourth diode connected across said second IGBT/FET shunt control transistor; and
a second transorb device connected across said first and second IGBT/FET shunt control transistors.

28. The IGBT/FET-based energy savings device of claim 27 further comprising:
a first isolated optically coupled driver configured to turn-on and turn-off said first IGBT/FET device;
a second isolated optically coupled driver configured to turn-on and turn-off said second IGBT/FET device;
a third isolated optically coupled driver configured to turn-on and turn-off said first IGBT/FET shunt control transistor; and
a fourth isolated optically coupled driver configured to turn-on and turn-off said second IGBT/FET shunt control transistor.

29. An IGBT/FET-based energy savings device comprising:
at least one power supply unit in electrical connection with said energy savings device for powering said energy savings device;
at least one phase input connection for inputting a predetermined amount of incoming energy having at least one analog signal into said energy savings device;
at least one sensing means connected to said at least one phase input connection for sensing said predetermined amount of incoming energy entered into said energy savings device via galvanic isolation;
at least one analog signal conditioning device for conditioning said at least one analog signal of said energy exiting said at least one magnetic flux concentrator;
at least one volts zero crossing point detector in electrical connection with said at least one phase input connection for determining at least one zero volts crossing point of said at least one analog signal;
at least one half cycle identifier in electrical connection with said at least one phase input connection for identifying at least one positive half cycle of said at least one analog signal and at least one negative half cycle of said at least one analog signal;
at least one logic device in electrical connection with said at least one volts zero crossing point detector and at least one half cycle identifier for routing said at least one positive half cycle of said at least one analog signal and said at least one negative half cycle of said at least one analog signal to at least one digital signal processor for processing said at least one analog signal;

said at least one digital signal processor in electrical connection with said at least one logic device for processing said at least one analog signal;

at least one voltage reducing means having at least one drive control wherein said at least one voltage reducing means is in electrical connection with said at least one digital signal processor for reducing said predetermined amount of incoming energy to yield a reduced amount of energy by providing pulse width modulation to the at least one analog signal;

at least one phase output connection in electrical connection with said at least one voltage reducing means for outputting said reduced energy out of said energy savings device;

at least one reset switch in electrical connection with said at least one digital signal processor;

at least one USB communications interface in electrical connection with said at least one digital signal processor; and at least computing device in electrical connection with said energy savings device;

wherein said at least one drive control comprises a first IGBT/FET device configured for providing pulse width modulation to said at least one positive half cycle of said at least one analog signal, a second IGBT/FET device configured for providing pulse width modulation to said at least one negative half cycle of said at least one analog signal, and a first IGBT/FET shunt control transistor and a second IGBT/FET shunt control transistor configured as routing switches to clamp a back electromagnetic field;

wherein a first diode is connected across said first IGBT/FET device, and a second diode is connected across said second IGBT/FET device;

wherein said second diode is configured to be conducting said at least one positive half cycle of said at least one analog signal and said second IGBT/FET device is configured to be in an on condition when said first IGBT/FET device is providing pulse width modulation, and said first diode is configured to be conducting said at least one negative half cycle of said at least one analog signal and said first IGBT/FET device is configured to be in an on condition when said second IGBT/FET device is providing pulse width modulation;

wherein said first IGBT/FET shunt control transistor is configured to be in an on condition when said first IGBT/FET device is providing pulse width modulation, and said second IGBT/FET shunt control transistor is configured to be in an on condition when said second IGBT/FET device is providing pulse width modulation;

wherein said at least one logic device is configured to work in real time to insure that said second IGBT/FET shunt control transistor is in an off condition and said second IGBT/FET device and said first IGBT/FET shunt control transistor are in an on condition when said first IGBT/FET device is providing pulse width modulation; and wherein said at least one logic device is configured to insure that said first IGBT/FET shunt control transistor is in an off condition and said first IGBT/FET device and said second IGBT/FET shunt control transistor are in an on condition when said second IGBT/FET device is providing pulse width modulation.

30. The IGBT/FET-based energy savings device of claim 29 further comprising:

at least one phase rotation device in electrical connection with said at least one analog signal conditioning device;

a first transorb device connected across said first and second IGBT/FET devices;

a third diode connected across said first IGBT/FET shunt control transistor;

a fourth diode connected across said second IGBT/FET shunt control transistor; and a second transorb device connected across said first and second IGBT/FET shunt control transistors;

wherein said first shunt control transistor is configured to shunt said third diode when said first shunt control transistor is in an on condition; and wherein said second shunt control transistor is configured to shunt said fourth diode when said second shunt control transistor is in an on condition.

31. An IGBT/FET-based energy savings system comprising:

a means for inputting a predetermined amount of incoming energy into said energy savings system;

a means for sensing said predetermined amount of incoming energy entered into said energy savings system;

a means for conditioning at least one analog signal of said energy;

a means for determining at least one volts zero crossing point of said at least one conditioned analog signal;

a means for identifying at least one positive half cycle and at least one negative half cycle of said at least one conditioned analog signal;

a means for routing said at least one positive half cycle of said at least one analog signal and said at least one negative half cycle of said at least one analog signal to at least one digital signal processor for processing said at lest one analog signal;

a means for processing said at least one conditioned analog signal;

a means for reducing said at least one conditioned analog signal of said predetermined amount of energy to yield a reduced amount of energy; and a means for outputting said reduced energy out of said energy savings system;

wherein said means for reducing comprises a first IGBT/FET device configured for providing pulse width modulation to said at least one positive half cycle of said at least one conditioned analog signal, a second IGBT/FET device configured for providing pulse width modulation to said at least one negative half cycle of said at least one conditioned analog signal, and a first IGBT/FET shunt control transistor and a second IGBT/FET shunt control transistor configured as routing switches to clamp a back electromagnetic field; and wherein a first diode is connected across said first IGBT/FET device, and a second diode is connected across said second IGBT/FET device.

32. The IGBT/FET-based energy savings system of claim 31, further comprising at least one logic device in electrical connection with said means for determining at least one volts zero crossing point of said at least one conditioned analog signal and said means for identifying at least one positive half cycle and at least one negative half cycle of said at least one conditioned analog signal;

wherein said at least one logic device is configured to work in real time to insure that said second IGBT/FET shunt control transistor is in an off condition and said second IGBT/FET device and said first IGBT/FET shunt control transistor are in an on condition when said first IGBT/FET device is srovidin ulse width modulation;

wherein said at least one logic device is configured to insure that said first IGBT/FET shunt control transistor is in an off condition and said first IGBT/FET device and said second IGBT/FET shunt control transistor are in an on condition when said second IGBT/FET device is providing pulse width modulation;

wherein said second diode is configured to be conducting said at least one positive half cycle of said at least one conditioned analog signal and said second IGBT/FET device is configured to be in an on condition when said first IGBT/FET device is providing pulse width modulation; and wherein said first diode is configured to be conducting said at least one negative half cycle of said at least one conditioned analog signal and said first IGBT/FET device is configured to be in an on condition when said second IGBT/FET device is providing pulse width modulation.

33. The IGBT/FET-based energy savings system of claim 32 further comprising:
a means for communicating with at least one computing device.

34. The IGBT/FET-based energy savings system of claim 32 further comprising:
a first transorb device connected across said first and second IGBT/FET devices;
a third diode connected across said first IGBT/FET shunt control transistor;
a fourth diode connected across said second IGBT/FET shunt control transistor; and
a second transorb device connected across said first and second IGBT/FET shunt control transistors.

35. The IGBT/FET-based energy savings system of claim 34 further comprising:
a first isolated optically coupled driver configured to turn-on and turn-off said first IGBT/FET device;
a second isolated optically coupled driver configured to turn-on and turn-off said second IGBT/FET device;
a third isolated optically coupled driver configured to turn-on and turn-off said first IGBT/FET shunt control transistor; and
a fourth isolated optically coupled driver configured to turn-on and turn-off said second IGBT/FET shunt control transistor.

36. The IGBT/FET-based energy savings system of claim 35 further comprising:
a means for powering said energy savings system;
wherein said means for sensing comprises a magnetic flux concentrator that is configured to measure said predetermined amount of incoming energy via galvanic isolation; and
wherein said means for sensing further comprises two comparators configured as a window comparator to pass a signal to said logic device in an over current condition.

37. The IGBT/FET-based energy savings system of claim 31 wherein:
said means for sensing said predetermined amount of energy entered into said energy savings system is at least one magnetic flux concentrator that measures current with galvanic isolation.

38. The IGBT/FET-based energy savings system of claim 31 wherein:
said means for conditioning at least one analog signal of said energy is at least one analog signal conditioning device that substantially reduces harmonics and any transients or interfering signals in said at least one analog signal.

39. The IGBT/FET-based energy savings system of claim 31 wherein:
said means for determining at least one volts zero crossing point of said at least one conditioned analog signal is at least one volts zero crossing point detector having at least one comparator and at least one Schmidt buffer.

40. The IGBT/FET-based energy savings system of claim 31 wherein:
said means for identifying at least one positive half cycle and at least one negative half cycle of said at least one conditioned analog signal is at least one half cycle identifier.

41. The IGBT/FET-based energy savings system of claim 31 wherein:
said means for routing said at least one positive half cycle of said at least one analog signal and said at least one negative half cycle of said at least one analog signal to at least one digital signal processor for processing said at least one analog signal is at least one logic device.

42. The IGBT/FET-based energy savings system of claim 41 wherein:
said at least one logic device is programmable.

43. The IGBT/FET-based energy savings system of claim 31 wherein:
said means for processing said at least one conditioned analog signal is at least one digital signal processor that performs a pulse width modulation function.

44. The IGBT/FET-based energy savings system of claim 31 further comprising:
a means for communicating with at least one computing device.

45. The IGBT/FET-based energy savings system of claim 33 further comprising:
a means for communicating with at least one computing device.

46. The IGBT/FET-based energy savings system of claim 31 further comprising:
a means for resetting said energy savings system.

47. The IGBT/FET-based energy savings system of claim 31 further comprising:
a means for detecting loss of said means for inputting a predetermined amount of energy into said energy savings system.

48. The IGBT/FET-based energy savings system of claim 47 wherein:
said means for detecting loss of said means for inputting a predetermined amount of energy into said energy savings system is at least one lost phase detection device in electrical connection with said means for conditioning said at least one analog signal of said energy.

49. The IGBT/FET-based energy savings system of claim 31 further comprising:
a means for rotating said means for inputting a predetermined amount of energy into said energy savings system.

50. The IGBT/FET-based energy savings system of claim 49 wherein:
said means for rotating said means for inputting a predetermined amount of energy into said energy savings system is at least one phase rotation device in electrical connection with said means for conditioning said at least one analog signal of said energy.

51. A method for using an IGBT/FET-based energy savings device comprising at least one phase input connection for inputting a predetermined amount of incoming energy having at least one alternating current analog signal into said energy savings device; at least one sensing means connected to said at least one phase input connection for sensing said predetermined amount of incoming energy entered into said energy savings device; at least one volts zero crossing point detector in electrical connection with said at least one phase input connection for determining at least one zero volts crossing point of said at least one analog signal; at least one half cycle identifier in electrical connection with said at least one phase input connection for identifying at least one positive half cycle of said at least one analog signal and at least one negative half cycle of said at least one analog signal; at least one logic device in electrical connection with said at least one volts zero crossing point detector and at least one half cycle identifier for routing said at least one positive half cycle of said at least one analog signal and said at least one negative half cycle of said at least one analog signal to at least one digital signal processor for processing said at least one analog signal; said at least one digital signal processor in electrical connection with said at least one logic device for processing said at least one analog signal; at least one voltage reducing means having at least one drive control wherein said at least one voltage reducing means is in electrical connection with said at least one digital signal processor for reducing said predetermined amount of incoming energy by providing pulse width modulation to the at least one analog signal to yield a reduced amount of energy; and at least one phase output connection in electrical connection with said at least one voltage reducing means for outputting said reduced energy out of said energy savings device, said method comprising steps of:

a. inputting a predetermined amount of energy having at least one analog signal into said energy savings device;
  b. sensing said predetermined amount of energy entered into said energy savings device;
  c. determining at least one volts zero crossing point of said at least one analog signal;
  d. identifying at least one positive half cycle of said at least one analog signal and at least one negative half cycle of said at least one analog signal;
  e. routing said at least one positive half cycle of said at least one analog signal and said at least one negative half cycle of said at least one analog signal to said at least one digital signal processor;
  f. processing said at least one analog signal;
  g. providing pulse width modulation to said at least one positive half cycle of said at least one analog signal with a first IGBT/FET device of said at least one drive control;
  h. providing pulse width modulation to said at least one negative half cycle of said at least one analog signal with a second IGBT/FET device of said at least one drive control;
  i. conducting said at least one negative half cycle of said at least one analog signal with a first diode connected across said first IGBT/FET device;
  j. conducting said at least one positive half cycle of said at least one analog signal with a second diode connected across said second IGBT/FET device;
  k. turning on said second IGBT/FET device when said first IGBT/FET device is providing pulse width modulation;
  l. turning on said first IGBT/FET device when said second IGBT/FET device is providing pulse width modulation;
  m. turning on a first IGBT/FET shunt control transistor configured as a routing switch to clamp a back electromagnetic field when said first IGBT/FET device is providing pulse width modulation;
  n. turning on a second IGBT/FET shunt control transistor configured as a routing switch to clamp a back electromagnetic field when said second IGBT/FET device is providing pulse width modulation;
  o. reducing said predetermined amount of energy by providing pulse width modulation to said at least one analog signal; and
  p. outputting said reduced amount of energy out of said energy savings device.

52. The method of claim 51 further comprising the steps of:
  working said at least one logic device in real time to insure that said second IGBT/FET shunt control transistor is in an off condition and said second IGBT/FET device and said first IGBT/FET shunt control transistor are in an on condition when said first IGBT/FET device is providing pulse width modulation; and
  working said at least one logic device in real time to insure that said first IGBT/FET shunt control transistor is in an off condition and said first IGBT/FET device and said second IGBT/FET shunt control transistor are in an on condition when said second IGBT/FET device is providing pulse width modulation.

53. The method of claim 52 further comprising the step of:
  sending an over-current condition signal from said sensing means to said at least one logic control device and shutting down said IGBT/FET energy savings device in response.

54. The method of claim 52 further comprising the steps of:
  sending a first drive signal to said first IGBT/FET device with a first isolated optically-coupled driver;
  sending a second drive signal to said second IGBT/FET device with a second isolated optically-coupled driver;
  sending a third drive signal to said first IGBT/FET shunt control transistor with a third isolated optically-coupled driver; and
  sending a fourth drive signal to said second IGBT/FET shunt control transistor with a fourth isolated optically-coupled driver.

55. The method of claim 54 further comprising the step of:
  clamping a first spike of energy during a first switching operation with a first transorb device connected across said first and second IGBT/FET devices.

56. The method of claim 55 further comprising the step of:
  clamping a second spike of energy during a second switching operation with a second transorb device connected across said first and second IGBT/FET shunt control transistors.

57. The method of claim 55 further comprising a step after processing said at least one analog signal of:
  conditioning said at least one analog signal.

58. The method of claim 51 further comprising a step prior to step a of:
  powering said energy savings device.

59. The method of claim 51 further comprising a step prior to step a of:
  programming an energy savings amount into said energy savings device.

60. The method of claim 51 further comprising a step after step h of:
  programming an energy savings amount into said energy savings device.

61. The method of claim 60 further comprising a step after powering said energy savings device of:
  programming an energy savings amount into said energy savings device.

62. The method of claim 51 further comprising the step of:
  pulse width modulating said at least one analog signal.

63. The method of claim 51, wherein said steps of turning said first and second IGBT/FET shunt control transistors on prevents a collapsing magnetic field from occurring.

64. The method of claim 51 further comprising the step of:
clamping a first spike of energy during a first switching operation with a first transorb device connected across said first and second IGBT/FET devices.

65. The method of claim 64 further comprising the step of:
clamping a second spike of energy during a second switching operation with a second transorb device connected across said first and second IGBT/FET shunt control transistors.

66. The method of claim 65, further comprising the steps of:
sending a first drive signal to said first IGBT/FET device with a first isolated optically-coupled driver;
sending a second drive signal to said second IGBT/FET device with a second isolated optically-coupled driver;
sending a third drive signal to said first IGBT/FET shunt control transistor with a third isolated optically-coupled driver; and
sending a fourth drive signal to said second IGBT/FET shunt control transistor with a fourth isolated optically-coupled driver.

67. A method for using an IGBT/FET-based energy savings comprising a means for inputting a predetermined amount of energy into said energy savings system; a means for sensing said predetermined amount of energy entered into said energy savings system; a means for conditioning at least one AC analog signal of said energy; a means for determining at least one volts zero crossing point of said at least one conditioned analog signal; a means for identifying at least one positive half cycle and at least one negative half cycle of said at least one conditioned analog signal; a means for routing said at least one positive half cycle of said at least one analog signal and said at least one negative half cycle of said at least one analog signal to at least one digital signal processor for processing said at lest one analog signal; a means for processing said at least one conditioned analog signal; a means for reducing said at least one conditioned analog signal of said predetermined amount of energy; and a means for outputting said reduced energy out of said energy savings system, said method comprising steps of:
a. inputting a predetermined amount of incoming energy having at least one analog signal into said energy savings system;
b. sensing said predetermined amount of incoming energy entered into said energy savings system;
c. determining at least one volts zero crossing point of said at least one analog signal;
d. identifying at least one positive half cycle of said at least one analog signal and at least one negative half cycle of said at least one analog signal;
e. routing said at least one positive half cycle of said at least one analog signal and said at least one negative half cycle of said at least one analog signal to said at least one digital signal processor;
f. processing said at least one analog signal;
g. providing pulse width modulation to said at least one positive half cycle of said at least one analog signal with a first IGBT/FET device of said at least one drive control;
h. providing pulse width modulation to said at least one negative half cycle of said at least one analog signal with a second IGBT/FET device of said at least one drive control;
i. conducting said at least one negative half cycle of said at least one analog signal with a first diode connected across said first IGBT/FET device;
j. conducting said at least one positive half cycle of said at least one analog signal with a second diode connected across said second IGBT/FET device;
k. reducing said predetermined amount of energy by providing pulse width modulation to said at least one analog signal to yield a reduced amount of energy; and
l. outputting said reduced amount of energy out of said energy savings system.

68. The method of claim 67 further comprising the steps of:
turning on said second IGBT/FET device when said first IGBT/FET device is providing pulse width modulation;
turning on said first IGBT/FET device when said second IGBT/FET device is providing pulse width modulation;
turning on a first IGBT/FET shunt control transistor configured as a routing switch to clamp a back electromagnetic field when said first IGBT/FET device is providing pulse width modulation;
turning on a second IGBT/FET shunt control transistor configured as a routing switch to clamp a back electromagnetic field when said second IGBT/FET device is providing pulse width modulation;
working a logic device in real time to insure that said second IGBT/FET shunt control transistor is in an off condition and said second IGBT/FET device and said first IGBT/FET shunt control transistor are in an on condition when said first IGBT/FET device is providing pulse width modulation; and
working said logic device in real time to insure that said first IGBT/FET shunt control transistor is in an off condition and said first IGBT/FET device and said second IGBT/FET shunt control transistor are in an on condition when said second IGBT/FET device is providing pulse width modulation.

69. The method of claim 68 further comprising the steps of:
clamping a first spike of energy during a first switching operation with a first transorb device connected across said first and second IGBT/FET devices; and
clamping a second spike of energy during a second switching operation with a second transorb device connected across said first and second IGBT/FET shunt control transistors.

70. A method for using an IGBT/FET-based energy savings comprising at least one phase input connection for inputting a predetermined amount of incoming energy having at least one AC analog signal into said energy savings device; at least one magnetic flux concentrator connected to said at least one phase input connection for sensing said predetermined amount of incoming energy entered into said energy savings device; at least one volts zero crossing point detector in electrical connection with said at least one phase input connection for determining at least one zero volts crossing point of said at least one analog signal; at least one half cycle identifier in electrical connection with said at least one phase input connection for identifying at least one positive half cycle of said at least one analog signal and at least one negative half cycle of said at least one analog signal; at least one logic device in electrical connection with said at least one volts zero crossing point detector and at least one half cycle identifier for routing said at least one positive half cycle of said at least one analog signal and said at least one negative half cycle of said at least one analog signal to at least one digital signal processor for processing said at lest one analog signal; said at least one digital signal processor in electrical connection with said at least one logic device for processing said at least one analog signal; at least one voltage reducing means in electrical connection with said at least one digital signal processor for reducing said predetermined amount of incoming energy by providing pulse width modulation to the at least one analog signal to yield a reduced amount of energy; and at least one phase output connection in electrical connection with said at least one voltage reducing means for outputting said reduced energy out of said energy savings device, said method comprising steps of a. inputting a predetermined amount of incoming energy having at least one analog signal into said energy savings device;
b. sensing said predetermined amount of incoming energy entered into said energy savings device;
c. determining at least one volts zero crossing point of said at least one analog signal;
d. identifying at least one positive half cycle of said at least one analog signal;
e. routing said at least one positive half cycle of said at least one analog signal to said at least one digital signal processor;
f. processing said at least one analog signal;
g. providing pulse width modulation to said at least one positive half cycle of said at least one analog signal with a first IGBT/FET device of said at least one drive control;
h. providing pulse width modulation to said at least one negative half cycle of said at least one analog signal with a second IGBT/FET device of said at least one drive control;
i. conducting said at least one negative half cycle of said at least one analog signal with a first diode connected across said first IGBT/FET device;
j. conducting said at least one positive half cycle of said at least one analog signal with a second diode connected across said second IGBT/FET device;
k. turning on said second IGBT/FET device when said first IGBT/FET device is providing pulse width modulation;
l. turning on said first IGBT/FET device when said second IGBT/FET device is providing pulse width modulation;
m. turning on a first IGBT/FET shunt control transistor configured as a routing switch to clamp a back electromagnetic field when said first IGBT/FET device is providing pulse width modulation;
n. turning on a second IGBT/FET shunt control transistor configured as a routing switch to clamp a back electromagnetic field when said second IGBT/FET device is providing pulse width modulation;
o. reducing said predetermined amount of energy by providing pulse width modulation to said at least one analog signal to yield a reduced amount of energy; and
p. outputting said reduced amount of energy out of said energy savings device.

71. The method of claim 70 further comprising the steps of:
sensing said predetermined amount of incoming energy via galvanic isolation with said magnetic flux concentrator;
sending an over-current condition signal through two comparators configured as a window comparator to said logic device; and
shutting down said IGBT/FET-based energy savings device in response.

72. The method of claim 71 further comprising the steps of:
working said logic device in real time to insure that said second IGBT/FET shunt control transistor is in an off condition and said second IGBT/FET device and said first IGBT/FET shunt control transistor are in an on condition when said first IGBT/FET device is providing pulse width modulation; and
working said logic device in real time to insure that said first IGBT/FET shunt control transistor is in an off condition and said first IGBT/FET device and said second IGBT/FET shunt control transistor are in an on condition when said second IGBT/FET device is providing pulse width modulation.

73. A method for using an IGBT/FET-based energy savings comprising at least one phase input connection for inputting a predetermined amount of incoming energy having at least one analog signal into said energy savings device; at least one magnetic flux concentrator connected to said at least one phase input connection for sensing said predetermined amount of incoming energy entered into said energy savings device; at least one volts zero crossing point detector in electrical connection with said at least one phase input connection for determining at least one zero volts crossing point of said at least one analog signal; at least one half cycle identifier in electrical connection with said at least one phase input connection for identifying at least one positive half cycle of said at least one analog signal and at least one negative half cycle of said at least one analog signal; at least one logic device in electrical connection with said at least one volts zero crossing point detector and at least one half cycle identifier for routing said at least one positive half cycle of said at least one analog signal and said at least one negative half cycle of said at least one analog signal to at least one digital signal processor for processing said at lest one analog signal; said at least one digital signal processor in electrical connection with said at least one logic device for processing said at least one analog signal; at least one voltage reducing means in electrical connection with said at least one digital signal processor for reducing said predetermined amount of energy by providing pulse width modulation to the at least one analog signal; and at least one phase output connection in electrical connection with said at least one voltage reducing means for outputting said reduced energy out of said energy savings device, said method comprising steps of:

a. inputting a predetermined amount of incoming energy having at least one analog signal into said energy savings device;
b. sensing said predetermined amount of incoming energy entered into said energy savings device;
c. determining at least one volts zero crossing point of said at least one analog signal;
d. identifying at least one negative half cycle of said at least one analog signal;
e. routing said at least one negative half cycle of said at least one analog signal to said at least one digital signal processor;
f. processing said at least one analog signal;
g. providing pulse width modulation to said at least one positive half cycle of said at least one analog signal with a first IGBT/FET device of said at least one drive control;
h. providing pulse width modulation to said at least one negative half cycle of said at least one analog signal with a second IGBT/FET device of said at least one drive control;
i. conducting said at least one negative half cycle of said at least one analog signal with a first diode connected across said first IGBT/FET device;
j. conducting said at least one positive half cycle of said at least one analog signal with a second diode connected across said second IGBT/FET device;

k. turning on said second IGBT/FET device when said first IGBT/FET device is providing pulse width modulation;
l. turning on said first IGBT/FET device when said second IGBT/FET device is providing pulse width modulation;
m. turning on a first IGBT/FET shunt control transistor configured as a routing switch to clamp a back electromagnetic field when said first IGBT/FET device is providing pulse width modulation;
n. turning on a second IGBT/FET shunt control transistor configured as a routing switch to clamp a back electromagnetic field when said second IGBT/FET device is providing pulse width modulation;
o. working said at least one logic device in real time to insure that said second IGBT/FET shunt control transistor is in an off condition and said second IGBT/FET device and said first IGBT/FET shunt control transistor are in an on condition when said first IGBT/FET device is providing pulse width modulation;
p. working said at least one logic device in real time to insure that said first IGBT/FET shunt control transistor is in an off condition and said first IGBT/FET device and said second IGBT/FET shunt control transistor are in an on condition when said second IGBT/FET device is providing pulse width modulation;
q. reducing said predetermined amount of incoming energy by providing pulse width modulation to said at least one analog signal to yield a reduced amount of energy; and
r. outputting said reduced amount of energy out of said energy savings device.

74. The method of claim 73 further comprising a step after step d of:
identifying at least one positive half cycle of said at least one analog signal.

75. The method of claim 74 further comprising a step after identifying at least one positive half cycle of said at least one analog signal of:
routing said at least one positive half cycle of said at least one analog signal to said at least one digital signal processor.

76. The method of claim 73, further comprising:
clamping a first spike of energy during a first switching operation with a first transorb device connected across said first and second IGBT/FET devices; and
clamping a second spike of energy during a second switching operation with a second transorb device connected across said first and second IGBT/FET shunt control transistors.

77. The method of claim 76, further comprising:
sending a first drive signal to said first IGBT/FET device with a first isolated optically-coupled driver;
sending a second drive signal to said second IGBT/FET device with a second isolated optically-coupled driver;
sending a third drive signal to said first IGBT/FET shunt control transistor with a third isolated optically-coupled driver; and
sending a fourth drive signal to said second IGBT/FET shunt control transistor with a fourth isolated optically-coupled driver.

* * * * *